US012801219B2

(12) United States Patent
Chen et al.

(10) Patent No.: US 12,801,219 B2
(45) Date of Patent: Nov. 17, 2026

(54) SYSTEMS, APPARATUS, AND METHODS FOR PROVIDING HAPTIC FEEDBACK AT ELECTRONIC USER DEVICES

(71) Applicant: Intel Corporation, Santa Clara, CA (US)

(72) Inventors: Shan-Chih Chen, Taoyuan City (TW); C.Y. Liang, Zhubei City (TW)

(73) Assignee: Intel Products IP LLC, Santa Clara, CA (US)

(*) Notice: Subject to any disclaimer, the term of this patent is extended or adjusted under 35 U.S.C. 154(b) by 127 days.

(21) Appl. No.: 17/711,824

(22) Filed: Apr. 1, 2022

(65) Prior Publication Data

US 2022/0221938 A1 Jul. 14, 2022

(51) Int. Cl.

| | |
|---|---|
| ***G06F 3/01*** | (2006.01) |
| ***G06F 3/0354*** | (2013.01) |
| ***G06F 3/041*** | (2006.01) |
| ***G06F 3/0488*** | (2022.01) |

(52) U.S. Cl.

CPC .......... *G06F 3/016* (2013.01); *G06F 3/03545* (2013.01); *G06F 3/0416* (2013.01); *G06F 3/0488* (2013.01)

(58) Field of Classification Search

CPC .... G06F 3/016; G06F 3/03545; G06F 3/0416; G06F 3/0488; G06F 3/04886; G06F 2203/014

See application file for complete search history.

(56) References Cited

U.S. PATENT DOCUMENTS

| | | | | |
|---|---|---|---|---|
| 7,036,086 | B2 | 4/2006 | Cobbley et al. | |
| 8,432,365 | B2 * | 4/2013 | Kim | G06F 3/0488 345/173 |
| 10,001,837 | B2 | 6/2018 | Anderson | |
| 11,126,269 | B2 * | 9/2021 | Strandberg | B60K 35/10 |
| 2006/0109256 | A1 * | 5/2006 | Grant | G06F 3/041 345/173 |
| 2006/0187215 | A1 * | 8/2006 | Rosenberg | A63F 13/20 345/173 |
| 2013/0088439 | A1 * | 4/2013 | Shih | G06F 3/016 345/173 |
| 2015/0091818 | A1 * | 4/2015 | Kim | H04N 13/167 345/173 |
| 2017/0285748 | A1 * | 10/2017 | Evans, V | G02F 1/13338 |
| 2018/0066636 | A1 * | 3/2018 | Khoshkava | C22F 1/006 |
| 2019/0310723 | A1 * | 10/2019 | Kang | H04N 21/2387 |
| 2019/0384396 | A1 * | 12/2019 | Cruz Hernandez | B06B 1/0246 |
| 2020/0150828 | A1 * | 5/2020 | Kim | G06F 3/041 |

(Continued)

*Primary Examiner* — Amy Onyekaba

(74) *Attorney, Agent, or Firm* — Hanley, Flight & Zimmerman, LLC

(57) ABSTRACT

Systems, apparatus, and methods for providing haptic feedback at electronic user devices are disclosed. An example apparatus includes processor circuitry to perform operations to instantiate touch response area detection circuitry to identify a touch response area of a display screen; haptic feedback analysis circuitry to detect that a location of a touch on the display screen is within the touch response area and output an instruction to cause a haptic feedback response; and haptic feedback control circuitry to, in response to the instruction, cause a haptic feedback actuator to generate the haptic feedback response based on the location of the touch and a property of the haptic feedback response.

20 Claims, 19 Drawing Sheets

(56) References Cited

U.S. PATENT DOCUMENTS

| | | | | |
|---|---|---|---|---|
| 2021/0117152 | A1* | 4/2021 | Deisher | G06F 3/0482 |
| 2022/0011869 | A1* | 1/2022 | Lawrence | G01P 15/00 |
| 2023/0143709 | A1* | 5/2023 | Lorenz | G06F 3/03547<br>345/169 |

* cited by examiner

SYSTEMS, APPARATUS, AND METHODS FOR PROVIDING HAPTIC FEEDBACK AT ELECTRONIC USER DEVICES

FIELD OF THE DISCLOSURE

This disclosure relates generally to electronic user devices and, more particularly, to systems, apparatus, and methods for providing haptic feedback at electronic user devices.

BACKGROUND

An electronic user device can include haptic actuators to provide tactile feedback (e.g., vibrations) in response to a user touch input received via a display screen of the device.

Figure 1:
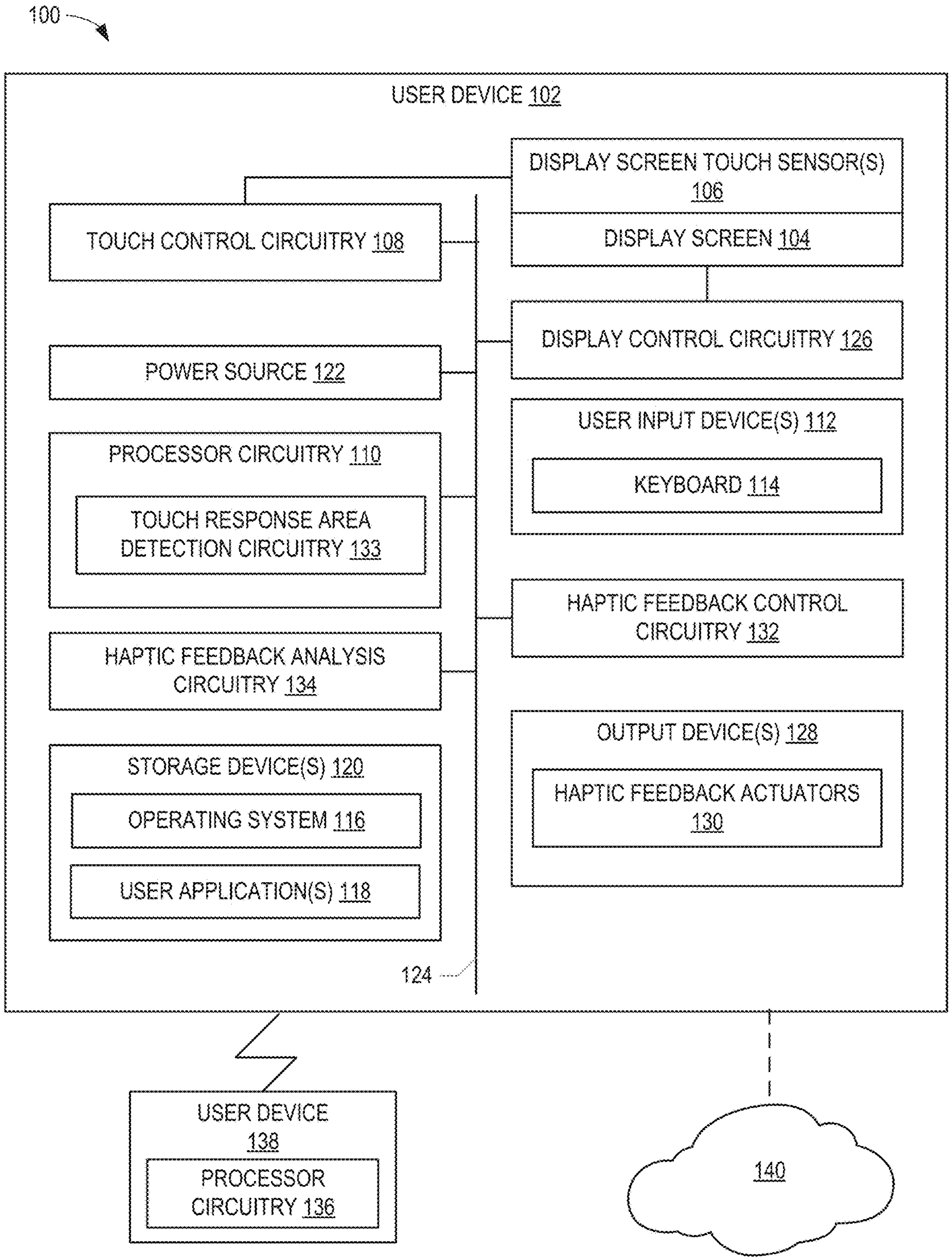
FIG. 1 illustrates an example system constructed in accordance with teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An electronic user device can include haptic actuators to provide tactile feedback (e.g., vibrations) in response to a user touch input received via a display screen of the device. However, in some instances, the location of the touch input by the user may occur between two or more haptic actuators of the display screen, thereby failing to cause the feedback and/or causing a diluted amount of feedback. Also, in some instances, a portion of the display screen may present graphical content for which haptic feedback is to be provided, such as a virtual keyboard. However, other portions of the display screen may present content (e.g., an image, a video) for which haptic feedback is not intended or expected by the user.

In some instances, the portion of the display screen presenting content for which haptic feedback is to be provided may change during operation of the user device. For instance, a location and/or size of a virtual keyboard on the display screen can differ when the virtual keyboard is presented in connection with a word processing application as compared to, for instance, a text messaging application. In some instances, a user may be able to modify the location and/or size of the virtual keyboard on the display screen (e.g., by dragging the virtual keyboard to a different position on the display screen). Thus, an area of the display screen for which haptic feedback is to be provided in response to touch inputs can change during use of the electronic user device.

Disclosed herein are example systems, apparatus, and methods for providing selective haptic feedback in response to user inputs on a display screen. Examples disclosed herein select particular haptic feedback actuators of the display screen to provide haptic feedback based on touch position data generated by touch control circuitry in response to touch events on the display screen. As a result, examples disclosed herein provide for haptic feedback output at location(s) of the display screen that more precisely align with the locations of the user touch inputs to provide for accurate feedback to the user.

Examples disclosed herein identify portion(s) of the display screen for which haptic feedback is to be provided and detect changes in the locations of the portion(s) (e.g., due to movement and/or change of a graphical user interface (GUI)). Examples disclosed herein identify a location of a touch response area on the display screen corresponding to graphical content (e.g., a GUI such as a virtual keyboard) for which haptic feedback is to be provided. In response to notifications from touch control circuitry of the user device indicating that a touch event has occurred, examples disclosed herein identify the location of the touch response area based on, for example, information from the application presenting the graphical content and/or analysis of display frames presented at the time of the touch event, etc. Thus, examples disclosed herein can detect changes in the areas of the display screen for which haptic feedback is to be provided (e.g., due to movement and/or change of a graphical user interface (GUI)). Examples disclosed herein generate instructions to cause the haptic feedback to be generated when the touch event has occurred within the touch response area. Thus, examples disclosed herein provide for accurate haptic feedback outputs in response to dynamic changes in the presentation of graphical content on the display screen (e.g., where a first GUI is replaced with a second GUI, when a GUI is moved relative to the display screen, etc.).

FIG. 1 illustrates an example system 100 constructed in accordance with teachings of this disclosure for providing haptic feedback to a user of a user device 102. (The terms "user" and "subject" are used interchangeably herein and both refer to a human being). The user device 102 can be, for example, a personal computing device such as a laptop computer, a desktop computer, an electronic tablet, an all-in-one PC, a hybrid or convertible PC, a mobile phone, a monitor, etc.

The example user device 102 of FIG. 1 includes a display screen 104. In the example of FIG. 1, the display screen 104 is a touch screen that enables a user to interact with data presented on the display screen 104 by touching the screen with a stylus and/or one or more fingers or a hand of the user. The example display screen 104 includes one or more display screen touch sensor(s) 106 that detect electrical changes (e.g., changes in capacitance, changes in resistance) in response to touches on the display screen. In some examples, the display screen is a capacitive display screen. In such examples, the display screen touch sensors 106 include sense lines that intersect with drive lines carrying current. The sense lines transmit signal data when a change in voltage is detected at locations where the sense lines intersect with drive lines in response to touches on the display screen 104. In other examples, the display screen 104 is a resistive touch screen and the display screen touch sensor(s) 106 include sensors that detect changes in voltage when conductive layers of the resistive display screen 104 are pressed together in response to pressure on the display screen from the touch. In some examples, the display screen touch sensor(s) 106 can include force sensor(s) that detect an amount of force or pressure applied to the display screen 104 by the user's finger or stylus.

The example user device 102 of FIG. 1 includes touch control circuitry 108 to process the signal data generated by the display screen touch sensor(s) 106 when the user touches the display screen 104. The touch control circuitry 108 interprets the signal data to identify particular locations of touch events on the display screen 104 (e.g., where voltage change(s) were detected by the sense line(s) in a capacitive touch screen). The touch control circuitry 108 communicates the touch event(s) to, for example, processor circuitry 110 (e.g., a central processing unit) of the user device 102. Additionally or alternatively, the user can interact with data presented on the display screen 104 via one or more user input devices 112, such as microphone(s) that detect sounds in the environment in which the user device 102 is located, a keyboard, a mouse, a touch pad, etc. In some examples, the touch control circuitry 108 is implemented by stand-alone circuitry in communication with the processor circuitry 110. In some examples, the touch control circuitry 108 is implemented by the processor circuitry 110.

The processor circuitry 110 of the illustrated example is a semiconductor-based hardware logic device. The hardware processor circuitry 110 may implement a central processing unit (CPU) of the user device 102, may include any number of cores, and may be implemented, for example, by a processor commercially available from Intel® Corporation. The processor circuitry 110 executes machine readable instructions (e.g., software) including, for example, an operating system 116 and/or other user application(s) 118 installed on the user device 102, to interpret and output response(s) based on the user input event(s) (e.g., touch event(s), keyboard input(s), etc.). The operating system 116 and the user application(s) 118 are stored in one or more storage devices 120. The user device 102 of FIG. 1 includes a power source 122 such as a battery and/or a transformer and AC/DC convertor to provide power to the processor circuitry 110 and/or other components of the user device 102 communicatively coupled via a bus 124. Some or all of the processor circuitry 110 and/or storage device(s) 120 may be located on a same die and/or on a same printed circuit board (PCB).

Display control circuitry 126 (e.g., a graphics processing unit (GPU)) of the example user device 102 of FIG. 1 controls operation of the display screen 104 and facilitates rending of content (e.g., display frame(s) associated with graphical user interface(s)) via the display screen 104. As discussed above, the display screen 104 is a touch screen that enables the user to interact with data presented on the display screen 104 by touching the screen with a stylus and/or one or more fingers of a hand of the user. In some examples, the display control circuitry 126 is implemented by stand-alone circuitry in communication with the processor circuitry 110. In some examples, the display control circuitry 126 is implemented by the processor circuitry 110.

The example user device 102 includes one or more output devices 128 (e.g., speaker(s)) to provide outputs to a user. The example user device 102 of FIG. 1 can provide haptic feedback or touch experiences to the user of the user device 102 via vibrations, forces, etc. that are output in response to, for example, touch event(s) on the display screen 104 of the device 102. The example user device 102 includes one or more haptic feedback actuator(s) 130 (e.g., piezoelectric actuator(s)) to produce, for instance, vibrations. The example user device 102 includes haptic feedback control circuitry 132 to control the actuator(s) 130. In some examples, the haptic feedback control circuitry 132 is implemented by stand-alone circuitry in communication with the processor circuitry 110. In some examples, the haptic feedback control circuitry 132 is implemented by the processor circuitry 110. In some examples, the processor circuitry 110, the touch control circuitry 108, the display control circuitry 126, and the haptic feedback control circuitry 132 are implemented on separate chips (e.g., separate integrated circuits), which may be carried by the same or different PCBs.

Although shown as one device 102, any or all of the components of the user device 102 may be in separate housings and, thus, the user device 102 may be implemented as a collection of two or more user devices. In other words, the user device 102 may include more than one physical housing. For example, the logic circuitry (e.g., the processor circuitry 110) along with support devices such as the one or more storage devices 120, a power supply 122, etc. may be a first user device contained in a first housing of, for example, a desktop computer, and the display screen 104, the touch sensor(s) 106, and the haptic feedback actuator(s) 130 may be contained in a second housing separate from the first housing. The second housing may be, for example, a display housing. Similarly, the user input device(s) 112 (e.g., microphone(s), camera(s), keyboard(s), touchpad(s), mouse, etc.) and/or the output device(s) (e.g., speaker(s), the haptic feedback actuator(s) 130) may be carried by the first housing, by the second housing, and/or by any other number of additional housings. Thus, although FIG. 1 and the accompanying description refer to the components as components of the user device 102, these components can be arranged in any number of manners with any number of housings of any number of user devices.

In the example of FIG. 1, the touch event(s) (e.g., user finger and/or stylus touch input(s)) detected by the display screen touch sensor(s) 106 and processed by the touch control circuitry 108 facilitate haptic feedback responses at the location(s) of the touch event(s) on the display screen 104. The touch control circuitry 108 generates touch coordinate position data indicative of location(s) or coordinate(s) of the touch event(s) detected by the display screen touch sensor(s) 106 on the display screen 104. The touch control circuitry 108 transmits the touch position data to the processor circuitry 110 (e.g., the operating system 116) to interpret and respond to the input(s) (e.g., commands) represented by the touch position data.

In the example of FIG. 1, the touch position data generated by the touch control circuitry 108 in response to the touch event(s) is passed to haptic feedback analysis circuitry 134. The haptic feedback analysis circuitry 134 analyzes the touch position data to determine if the touch event(s) occurred within an area of the display screen 104 that presents, for example, a virtual keyboard or other graphical content (e.g., components of a virtual game) for which haptic feedback is to be provided in response to touch input(s).

The area of the display screen 104 for which haptic feedback is to be provided is referred to herein as a touch response area. The example user device 102 of FIG. 1 includes touch response area detection circuitry 133 to identify the touch response area(s) of the display screen 104. The touch response area detection circuitry 133 generates touch response area location data including, for example, the coordinates of the touch response area(s) of the display region detected by the touch response area detection circuitry 133 at the time of the respective touch events.

In some examples, the touch response area detection circuitry 133 identifies user-defined preferences with respect to, for instance, a strength and/or duration of the haptic feedback (e.g., forces) to be generated in connection the touch response area(s). The haptic feedback setting(s) can be defined based on user inputs provided at, for example, the operating system 116 and/or the user application(s) 118 and accessed by the touch response area detection circuitry 133. In the example of FIG. 1, the touch response area detection circuitry 133 is implemented by the (e.g., main) processor circuitry 110 of the user device 102. In some examples, the touch response area detection circuitry 133 may be implemented by dedicated logic circuitry.

In the example of FIG. 1, the touch response area detection circuitry 133 transmits the touch response area location data and the haptic feedback settings to the haptic feedback analysis circuitry 134. The haptic feedback analysis circuitry 134 analyzes the touch position data to determine if the touch event(s) occurred within the touch response area(s) of the display screen 104. The haptic feedback analysis circuitry 134 determines if the touch event(s) occurred at location(s) on the display screen 104 that present, for example, a virtual keyboard or other graphical content (e.g., components of a virtual game) for which haptic feedback is to be provided in response to touch input(s).

The haptic feedback analysis circuitry 134 instructs the haptic feedback control circuitry 132 that the touch event occurred within the touch input area of the display screen 104 (e.g., the area of the display screen 104 where the virtual keyboard is presented). In response to the indication that the touch event occurred within the touch input area of the display screen 104, the haptic feedback control circuitry 132 uses the touch position data to identify which haptic feedback actuator(s) 130 should be activated to provide haptic feedback outputs (e.g., vibrations) and to cause the selected actuator(s) 130 to generate the haptic feedback. In some examples, the instructions from the haptic feedback analysis circuitry 134 provided to the haptic feedback control circuitry 132 includes the user-defined haptic feedback preferences with respect to, for instance, a strength and/or duration of the haptic feedback (e.g., forces).

In some examples, the haptic feedback analysis circuitry 134 is implemented by dedicated logic circuitry. In some examples (e.g., FIGS. 8-11), the haptic feedback analysis circuitry 134 is implemented by the touch control circuitry 108 or the haptic feedback control circuitry 132 of the user device 102. In some examples, the haptic feedback analysis circuitry 134 is implemented by the (e.g., main) processor circuitry 110 of the user device 102. In some examples, the haptic feedback analysis circuitry 134 is implemented by instructions executed on processor circuitry 136 of a wearable or non-wearable user device 138 different than the user device 102 and/or on one or more cloud-based devices 140 (e.g., one or more server(s), processor(s), and/or virtual machine(s)). In some examples, some of the haptic feedback analysis is implemented by the haptic feedback analysis circuitry 134 via a cloud-computing environment and one or more other parts of the analysis is implemented by one or more of the processor circuitry 110 of the user device 102, the touch control circuitry 108, the haptic feedback control circuitry 132, dedicated logic circuitry of the user device 102, and/or the processor circuitry 136 of the second user device 138.

Figure 2:
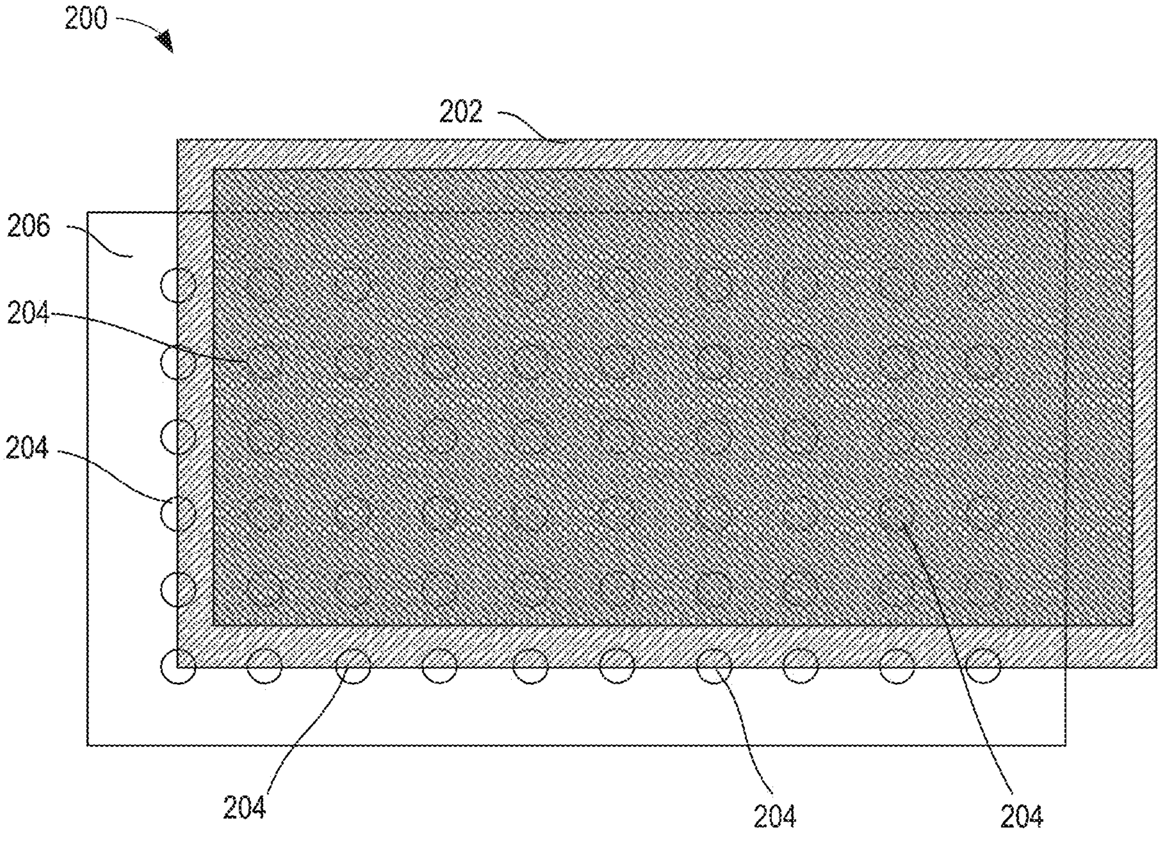
FIG. 2 illustrates an example implementation of the display screen of the user device of FIG. 1 in accordance with teachings of this disclosure.

FIG. 2 illustrates an example implementation of a display screen 200 (e.g., the display screen 104 of the example user device 102 of FIG. 1) in accordance with teachings of this disclosure. The example display screen 200 of FIG. 2 includes a display panel 202 including touch sensor(s) (e.g., the touch sensor(s) 106) that detect electrical changes (e.g., changes in capacitance, changes in resistance) and/or pressure changes in response to touches on the display panel 202.

The example display screen 200 of FIG. 2 includes haptic feedback actuators 204 (e.g., the haptic feedback actuators 130 of FIG. 1). The haptic feedback actuators 204 can include, for example, piezo sensors that generate vibrations in response to the application of voltage across ends of the piezo actuator, which causes the actuator to bend or deform. The frequency and/or amplitude of the vibrations of the piezo sensors can be adjusted to provide for haptic feedback outputs having different properties or characteristics. In the example of FIG. 2, the haptic feedback actuators 204 are supported by a printed circuit board 206 and/or other supporting structures.

Figure 3:
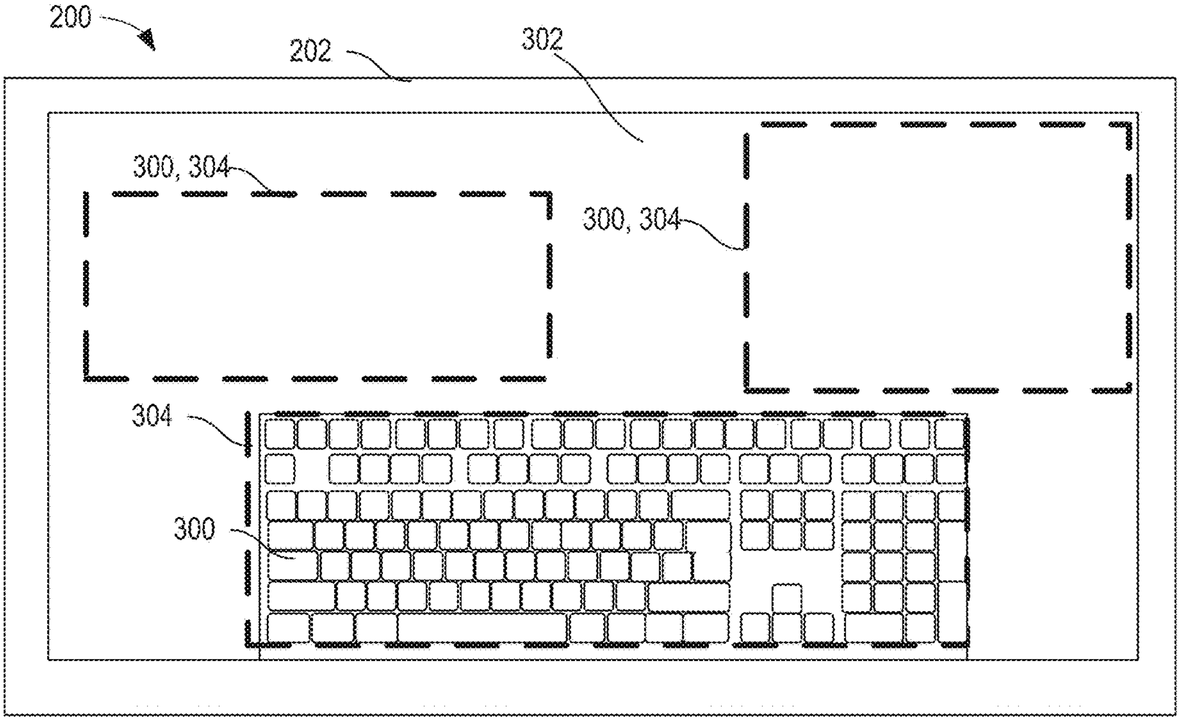
FIG. 3 illustrates example graphical user interface content presented via the example display screen of FIG. 2.

FIG. 3 illustrates the presentation of graphical content (e.g., graphical user interface content) via the example display screen 200 of FIG. 2. The display panel 202 of the example display screen 200 defines a display region 302 in which the graphical content is presented. In some examples, the display region 302 presents graphical content that a user may interact with by providing touch inputs(s) on the display screen 200 to provide inputs, commands, etc. to the application(s) 118 and/or the operating system 116 of the user device 102 of FIG. 1. For example, a virtual keyboard 300 is displayed in the display region 302 of FIG. 3.

As illustrated in FIG. 3, the virtual keyboard 300 is presented in a portion of the display region 302. A remaining portion of the display region 302 can present graphical content that may not be associated with touch inputs. For example, the portion of the display region 302 outside of the virtual keyboard 300 can present an image, a video, a blank page of a word processing document, etc. Activation of the haptic feedback actuator(s) 204 of FIG. 2 in response to a touch event on the virtual keyboard 300 can provide the user with tactile feedback confirming selection of a key of the keyboard 300. However, haptic feedback may not be relevant or expected in connection with graphical content presented in the remaining portion of the display region 302. For instance, if haptic feedback were generated when the user touches a portion of the display region 302 presenting a video, the user may be confused as to why the haptic feedback was generated if such feedback is not expected.

In the example of FIG. 3, the virtual keyboard 300 defines a touch response area 304 of the display region 302 for which haptic feedback is to be provided in response to touch events as compared to other portions of the display region 302. As disclosed herein, the haptic feedback analysis circuitry 134 of FIG. 1 determines whether or not a touch event has occurred within the touch response area 304 based on touch position data output by the touch control circuitry 108. Based on the detection of the touch event within the touch response area 304, the haptic feedback control circuitry 132 of FIG. 1 determines which haptic feedback actuators 204 should be activated to output a haptic response. In some examples, the touch response area 304 is larger than the virtual keyboard 300 (e.g., extends a distance beyond the borders of the virtual keyboard 300), includes a portion of the virtual keyboard 300 (e.g., a portion including numbers of the keyboard), etc.

A position and/or size of the virtual keyboard 300 and, thus, the touch response area 304 in the display region 302 can differ from the example shown in FIG. 3. For instance, the position at which the virtual keyboard 300 is presented in the display region 302 and/or a size of the virtual keyboard 300 can change based on the applications 118 associated with the virtual keyboard 300 at a given time. For instance, the size of the virtual keyboard 300 may be bigger when the keyboard 300 is associated with a word processing document as compared to when the keyboard 300 is associated with a text messaging application. Also, a location of the keyboard 300 may be presented at a bottom of the display region 302 as shown in FIG. 3 when the keyboard 300 is associated with the word processing document and a left or right hand side of the screen when the keyboard 300 is associated with the text messaging application (e.g., to facilitate one-handed texting). In some examples, the location and/or size of the keyboard 300 can be modified to accommodate presentation of other content in the display region 302. In some examples, an application 118 may permit the user to move the location of the virtual keyboard within the display region 302 (e.g., by dragging the virtual keyboard to a new location). Example locations and/or sizes of the virtual keyboard 300 within in the display region 302 and, thus, the touch response area 304 are represented by dashed boxes in FIG. 3.

As disclosed herein, the touch response area detection circuitry 133 of FIG. 1 recognizes changes in the characteristics of the touch response area 304 (e.g., size, location) relative to the display region 302. The haptic feedback analysis circuitry 134 determines whether or not the touch event(s) have occurred within the touch response area 304 based on the properties (e.g., location) of the touch response area 304 when the touch event(s) occur and the touch position data from the touch control circuitry 108. The haptic feedback control circuitry 132 determines which haptic feedback actuator(s) 130 to activate in response to the indication from the haptic feedback analysis circuitry 134 that the touch event has occurred within the touch response area 304.

Figure 4:
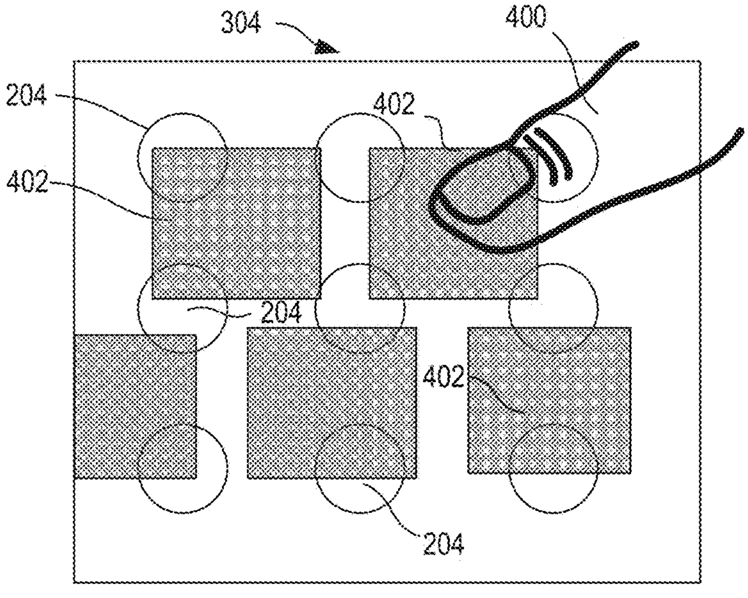
FIG. 4 illustrates an example touch event on the display screen of FIG. 2.

FIG. 4 illustrates an example touch event within the touch response area 304 of the display screen 200 of FIGS. 2 and 3. As shown in FIG. 4, a finger 400 of a user may select a key 402 of virtual keyboard 300 of FIG. 3. However, as shown in FIG. 4, the position of the touch input by the finger 400 on the display screen 200 does not align with a particular one of the haptic feedback actuators 204. Instead, the input is between two or more actuators. In this example, the haptic feedback control circuitry 132 receives instructions from the haptic feedback analysis circuitry 134 that the touch event corresponding to the user touch input in FIG. 4 is within the touch response area 304. In response, the haptic feedback control circuitry 132 executes one or more models or algorithms to identify or select which haptic feedback actuator(s) 204 to activate based on the touch position data (e.g., coordinate data). As a result, the haptic feedback control circuitry 132 activates the haptic feedback actuator(s) 204 proximate to the touch event to generate feedback to the user at the location or substantially proximate to the location at which the user's finger 400 provided the touch input on the display screen 200 (e.g., within a threshold distance of the location of the touch input).

Although the example of FIG. 4 refers to a touch event by a finger of a user, the touch event could be a stylus or pen touch event. Thus, in examples disclosed herein, touch events can refer to finger touch events or stylus or pen touch events.

Figure 5:
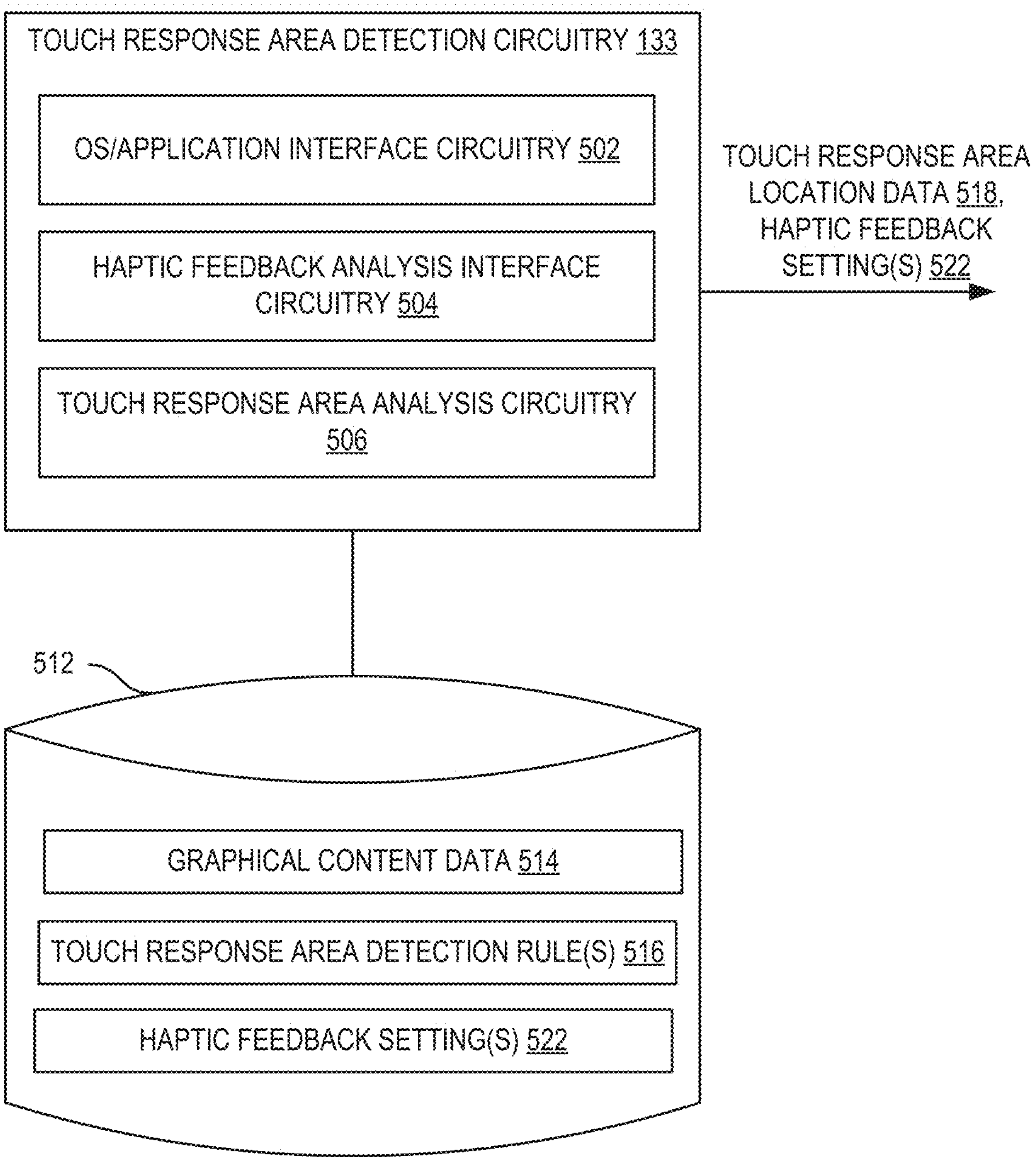
FIG. 5 is a block diagram of an example implementation of the touch response area detection circuitry of FIG. 1.

FIG. 5 is a block diagram of an example implementation of the touch response area detection circuitry 133 to identify touch response area(s) of a display screen, or area(s) of the display screen for which haptic feedback is to be provided in response to touch event(s) within the area(s). The touch response area detection circuitry 133 of FIG. 5 may be instantiated (e.g., creating an instance of, bring into being for any length of time, materialize, implement, etc.) by processor circuitry such as a central processing unit executing instructions. Additionally or alternatively, the touch response area detection circuitry 133 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by one or more virtual machines and/or containers executing on the microprocessor.

The example touch response area detection circuitry 133 of FIG. 5 includes operating system (OS)/application interface circuitry 502, haptic feedback analysis interface circuitry 504, and touch response area analysis circuitry 506.

The OS/application interface circuitry 502 of the example touch response area detection circuitry 133 of FIG. 5 facilitates communication with the operating system 116 and/or the user application(s) 118. For example, the OS/application interface circuitry 502 accesses information about the graphical content associated with touch input(s) and presented via the display screen 104, 200 at the time of the touch event(s). For example, the OS/application interface circuitry 502 can receive data such as the position and/or size of the virtual keyboard 300 presented via the display screen 104, 200.

The haptic feedback analysis interface circuitry 504 of the example touch response area detection circuitry 133 of FIG. 5 facilitates communication with the haptic feedback analysis circuitry 134 of FIG. 1. For example, as disclosed herein, the haptic feedback analysis interface circuitry 504 identifies user preferences for the characteristics of the haptic feedback (e.g., vibration strength) to be transmitted to the haptic feedback analysis circuitry 134.

The touch response area analysis circuitry 506 identifies or defines the location (e.g., coordinates) of the touch response area 304 in the display region 302 of the display screen 104, 200. The touch response area analysis circuitry 506 detects, for instance, customized location(s) of the virtual keyboard 300 in the display region 302 (where the virtual keyboard 300 corresponds to a touch response area 304) based on user configuration or placement of the keyboard 300 in the display region 302, changes in the size and/or location of the keyboard 300 to accommodate other content on the display screen 104, 200, etc. In some examples, the touch response area analysis circuitry 506 initiates the analysis of the touch response area in response to, for example, an application handle identifying an application that has been executed by the user device 102. In some examples, the touch response area analysis circuitry 506 initiates the analysis of the touch response area in response to detection of a touch event by the touch control circuitry 108.

In some examples, the operating system (OS)/application interface circuitry 502 receives graphical content data 514 from the operating system 116 and/or the application(s) 118. The graphical content data 514 can be stored in a database 512. In some examples, the touch response area detection circuitry 133 includes the database 512. In some examples, the database 512 is located external to the touch response area detection circuitry 133 in a location accessible to the touch response area detection circuitry 133 as shown in FIG. 5.

The graphical content data 514 can include characteristics of graphical content associated with touch input(s) and presented on the display screen 104, 200 at the time of the touch event(s), such as a size and/or position of the virtual keyboard. The touch response area analysis circuitry 506 determines the touch response area(s) 304 based on the characteristics of the graphical content defined in the graphical content data 514 relative to the display region 302 of the display screen 104, 200. The touch response area analysis circuitry 506 defines the touch response area(s) 304 based on the coordinates of the graphical content.

In some examples, the graphical content data 514 includes the display frame(s) rendered at the time of the touch event(s). The touch response area analysis circuitry 506 can detect the coordinates of the virtual keyboard and/or other graphical content associated with touch input(s) based on the analysis of the display frame(s). For example, the touch response area analysis circuitry 506 can detect that the virtual keyboard 300 is displayed via the display screen 200 based on analysis (e.g., image analysis) of the display frame rendered at the time of the touch event. In some examples, some or all of the graphical content data 514 is received via the display control circuitry 126.

In some examples, the touch response area analysis circuitry 506 detects that a user has accessed a particular application 118 on the user device 102 and/or menu of the operating system 116 (e.g., based on information received from the OS/application interface circuitry 502) that causes the virtual keyboard 300 or other graphical content (e.g., components of a game) that may receive touch input(s) to be presented. The touch response area analysis circuitry 506 identifies the location of the touch response area(s) 304 based on touch response area detection rule(s) 516 stored in the database 512. The touch response area detection rule(s) 516 can include the coordinates of the virtual keyboard 300 or other graphical content that may receive touch input(s) associated with the application(s) 118 and/or the operating system 116. For example, the touch response area detection rule(s) 516 can include the coordinates of a virtual keyboard as defined by a word processing application. When the touch response area analysis circuitry 506 determines that the word processing application is executed on the user device 102 (e.g., based on information received from the OS/application interface circuitry 502), the touch response area analysis circuitry 506 identifies the touch response area(s) 304 based on the coordinates in the touch response area detection rule(s) 516 for the word processing application.

In some examples, the touch response area analysis circuitry 506 detects the touch response area(s) 304 based on user inputs received at the user device 102. For example, the user can designate (e.g., mark) one or more portions of the display region 302 as area(s) for which the user would like to receive haptic feedback and the application(s) 118 and/or the operating system 116 can transmit the user input(s) as the graphical content data 514. In such examples, the touch response area analysis circuitry 504 identifies the coordinates of the area(s) defined by the user as the touch response area 304. In some examples, the user defines the area(s) for which the user would like to receive haptic feedback in response to prompt(s) from the application 118. In some examples, the operating system 116 and/or the user application(s) 118 cause a prompt to be output for the user to define or confirm the portion(s) in the display region 302 for which the user would like to receive haptic feedback and the graphical content data 514 is generated based on the user inputs.

The touch response area analysis circuitry 506 stores touch response area location data 518 in the database 512. The touch response area location data 518 includes the coordinates of the touch response area(s) 304 in the display region 302 detected by the touch response area analysis circuitry 504. For example, the touch response area location data 518 can include four coordinate points defining borders of the virtual keyboard 300, where coordinates of the display region 302 within the four coordinates setting the borders define the touch response area 304. In some examples, the touch response area 304 is larger or smaller than the virtual keyboard and/or other graphical content that may receive touch inputs.

The example database 512 of FIG. 5 stores haptic feedback setting(s) 522 including system and/or user-defined settings with respect to the haptic feedback to be generated for the touch response area(s) 304. In some examples, the haptic feedback setting(s) 522 indicate that no haptic feedback should be generated for the touch response area(s) 304 (e.g., based on user preferences). In some examples, the haptic feedback setting(s) 522 indicate that haptic feedback should be generated for the touch response area(s) 304 and include properties such as a strength and/or duration of the haptic feedback (e.g., vibrations). In some examples, the haptic feedback setting(s) 522 define default settings with respect to the properties of the haptic feedback (e.g., a default duration, a default amplitude and/or frequency of the vibrations).

In the example of FIG. 5, the touch response area detection circuitry 133 outputs the touch response area location data 518 and the haptic feedback setting(s) 522 to the haptic feedback analysis circuitry 134.

In some examples, the location(s) of the touch response area(s) 304 change over time due to, for example, user manipulation of the graphical content (e.g., moving the virtual keyboard 300 to a new location), changes in the application(s) 118 presenting graphical content, etc. In some examples, the (e.g., new) locations of the graphical content do not overlap with the (previous) locations of the graphical content. In some examples, the location of the touch response area 304 remains the same over time.

In some examples, the touch response area detection circuitry 133 verifies the location of the touch response area 304 in response to additional touch events. In some examples, the touch response area detection circuitry 133 verifies the location of the touch response area 304 in response to changes in the application(s) 118 executed by the device 102, the graphical content presented via the display screen 104, 200, etc. For example, based on additional graphical content data 514 received from the operating system 116 and/or the application(s) 118, the touch response area analysis circuitry 506 can detect changes in a size of the virtual keyboard and update the touch response area location data 518.

In some examples, the touch response area detection circuitry 133 includes means for analyzing a touch response area. For example, the means for analyzing a touch response area may be implemented by the touch response area analysis circuitry 506. In some examples, the touch response area analysis circuitry 506 may be instantiated by processor circuitry such as the example processor circuitry 1512 of FIG. 15. For instance, the touch response area analysis circuitry 506 may be instantiated by the example general purpose processor circuitry 1800 of FIG. 18 executing machine executable instructions such as that implemented by at least blocks 1202, 1204, 1206, 1208 of FIG. 12. In some examples, the touch response area analysis circuitry 506 may be instantiated by hardware logic circuitry, which may be implemented by an ASIC or the FPGA circuitry 1900 of FIG. 19 structured to perform operations corresponding to the machine readable instructions. Additionally or alternatively, the touch response area analysis circuitry 506 may be instantiated by any other combination of hardware, software, and/or firmware. For example, the touch response area analysis circuitry 506 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the touch response area detection circuitry 133 of FIG. 1 is illustrated in FIG. 5, one or more of the elements, processes, and/or devices illustrated in FIG. 5 may be combined, divided, re-arranged, omitted, eliminated, and/or implemented in any other way. Further, the example OS/application interface circuitry 502, the example haptic feedback analysis interface circuitry 504, the example touch response area analysis circuitry 506, and/or, more generally, the example touch response area detection circuitry 133 of FIG. 1, may be implemented by hardware alone or by hardware in combination with software and/or firmware. Thus, for example, any of the example OS/application interface circuitry 502, the example haptic feedback analysis interface circuitry 504, the example touch response area analysis circuitry 506, and/or, more generally, the example touch response area detection circuitry 133, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example haptic feedback analysis circuitry 134 of FIG. 1 may include one or more elements, processes, and/or devices in addition to, or instead of, those illustrated in FIG. 6, and/or may include more than one of any or all of the illustrated elements, processes, and devices.

Figure 6:
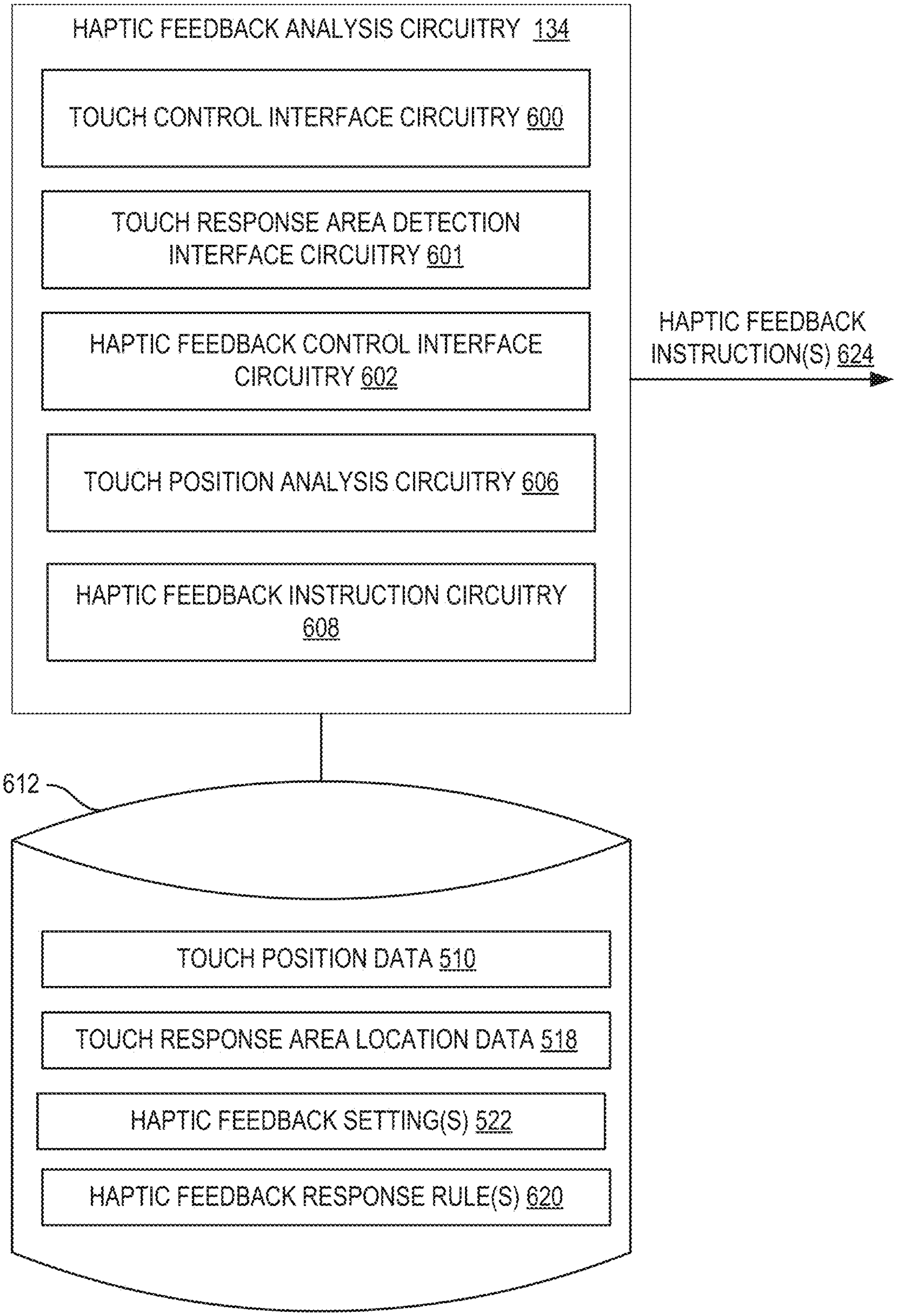
FIG. 6 is a block diagram of an example implementation of the haptic feedback analysis circuitry of FIG. 1.

FIG. 6 is a block diagram of an example implementation of the haptic feedback analysis circuitry 134 to identify touch events on a display screen relative to a touch response area for providing haptic feedback. The haptic feedback analysis circuitry 134 of FIG. 6 may be instantiated (e.g., creating an instance of, bring into being for any length of time, materialize, implement, etc.) by dedicated logic circuitry. In some examples, the haptic feedback analysis circuitry 134 of FIG. 6 may be instantiated (e.g., creating an instance of, bring into being for any length of time, materialize, implement, etc.) by the touch control circuitry 108 or the haptic feedback control circuitry 132. In some examples, the haptic feedback analysis circuitry 134 of FIG. 6 may be instantiated (e.g., creating an instance of, bring into being for any length of time, materialize, implement, etc.) by processor circuitry such as a central processing unit executing instructions. Additionally or alternatively, the haptic feedback analysis circuitry 134 of FIG. 6 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 may be implemented by one or more virtual machines and/or containers executing on the microprocessor.

The example haptic feedback analysis circuitry 134 of FIG. 6 includes touch control interface circuitry 600, touch response area detection interface circuitry 601, haptic feedback control interface circuitry 602, touch position analysis circuitry 606, and haptic feedback instruction circuitry 608.

The touch control interface circuitry 600 of the example haptic feedback analysis circuitry 134 of FIG. 6 facilitates communication with the touch control circuitry 108 of FIG. 1. For example, the touch control interface circuitry 600 receives touch position data 610 generated by the touch control circuitry 108 and indicative of location(s) or coordinate(s) of the touch event(s) detected by the display screen touch sensor(s) 106 on the display screen 104, 200.

The touch response area detection interface circuitry 601 of the example haptic feedback analysis circuitry 134 of FIG. 6 facilitates communication with the touch response area detection circuitry 133 of FIGS. 1 and/or 5. For example, the touch response area detection interface circuitry 601 receives the touch response area location data 518 and the haptic feedback setting(s) 522 from the touch response area detection circuitry 133. In some examples, the touch response area detection interface circuitry 601 receives the touch response area location data 518 and/or the haptic feedback setting(s) 522 when there have been changes to the touch response area location data 518 and/or the haptic feedback setting(s) 522. In some examples, the touch response area detection interface circuitry 601 receives the touch response area location data 518 and/or the haptic feedback setting(s) 522 in response to a touch event.

The touch position data 610 generated by the touch control circuitry 108 and received by the touch control interface circuitry 600 is stored in a database 612. Also, the touch response area location data 518 and the haptic feedback setting(s) 522 received from the touch response area detection circuitry 133 are stored in the database 612. In some examples, the haptic feedback analysis circuitry 134 includes the database 612. In some examples, the database 612 is located external to the haptic feedback analysis circuitry 134 in a location accessible to the haptic feedback analysis circuitry 134 as shown in FIG. 6.

The haptic feedback control interface circuitry 602 of the example haptic feedback analysis circuitry 134 of FIG. 6 facilitates communication with the haptic feedback control circuitry 132 of FIG. 1. For example, as disclosed herein, the haptic feedback control interface circuitry 602 can transmit instructions to the haptic feedback control circuitry 132 including touch position data, user preferences for the characteristics of the haptic feedback (e.g., vibration strength), etc.

The touch position analysis circuitry 606 of the example haptic feedback analysis circuitry 134 of FIG. 6 determines if the touch event(s) on the display screen 104, 200 detected by the touch control circuitry 108 and represented by the touch position data 610 are within the touch response area identified by the touch response area detection circuitry 133 (e.g., the touch response area analysis circuitry 506 of FIG. 5). For examples, the touch position analysis circuitry 606 compares the coordinates of the touch event in the touch position data 610 to the coordinates of the touch response area 304 defined in the touch response area location data 518 at the time of the touch event. If the coordinates of the touch event in the touch position data 610 are within the range of coordinates defining the touch response area 304, the touch position analysis circuitry 606 determines that the touch event occurred in the touch response area of the display region 302. If the coordinates of the touch event in the touch position data 610 are outside of the range of coordinates defining the touch response area 304, the touch position analysis circuitry 606 determines that the touch event occurred outside of the touch response area 304 of the display region 302.

The touch position analysis circuitry 606 outputs instructions or indicators to the haptic feedback instruction circuitry 608 with respect to whether the touch event occurred inside or outside of the touch response area 304 of the display region 302. The haptic feedback instruction circuitry 608 determines if a haptic feedback response should be provided based on the indicators from the touch position analysis circuitry 606 and haptic feedback response rule(s) 620. The haptic feedback response rule(s) 620 can be defined based on user inputs and stored in the database 612.

The haptic feedback response rule(s) 620 can indicate that when the touch event is outside of the touch response area 304 of the display region 302, then no haptic feedback should be provided. For instance, because a touch event on the display screen 104, 200 did not occur in the touch response area 304 corresponding to the virtual keyboard 300

(i.e., the touch event occurred elsewhere in the display region 302), the haptic feedback instruction circuitry 608 refrains from instructing the haptic feedback control circuitry 132 to generate haptic feedback.

The example haptic feedback response rule(s) 620 indicate that when the touch event is inside the touch response area 304 of the display region 302, the haptic feedback instruction circuitry 608 should instruct the haptic feedback control circuitry 132 to generate haptic feedback unless a user-defined haptic feedback setting 522 indicates that no haptic feedback should be generated.

In examples in which the touch event is inside the touch response area 304 and the haptic feedback setting(s) 522 indicate that haptic feedback should be provided, the haptic feedback instruction circuitry 608 outputs instruction(s) or report(s) 624 (e.g., an index) for the haptic feedback control circuitry 132. The instruction(s) 624 inform the haptic feedback control circuitry 132 that the touch event occurred in the touch response area and include the haptic feedback setting(s) 522 for the haptic feedback to be generated by the haptic feedback actuator(s) 130, 204. For example, the user-defined haptic feedback setting(s) 522 can define a strength of the haptic feedback vibrations, a duration of the vibrations, and/or other properties or characteristics of the haptic feedback outputs.

The example haptic feedback analysis circuitry 134 analyzes touch position data 610 generated over time to determine if additional touch event(s) have occurred in the touch response area and to generate corresponding instructions to cause the haptic feedback outputs.

In some examples, the haptic feedback analysis circuitry 134 includes means for analyzing a touch location. For example, the means for analyzing a touch location may be implemented by the touch position analysis circuitry 606. In some examples, the touch position analysis circuitry 606 may be instantiated by processor circuitry such as the example processor circuitry 1612 of FIG. 16. For instance, the touch position analysis circuitry 606 may be instantiated by the example general purpose processor circuitry 1800 of FIG. 18 executing machine executable instructions such as that implemented by at least block 1306 of FIG. 13. In some examples, the touch position analysis circuitry 606 may be instantiated by hardware logic circuitry, which may be implemented by an ASIC or the FPGA circuitry 1900 of FIG. 19 structured to perform operations corresponding to the machine readable instructions. Additionally or alternatively, the touch position analysis circuitry 606 may be instantiated by any other combination of hardware, software, and/or firmware. For example, the touch position analysis circuitry 606 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the haptic feedback analysis circuitry 134 includes means for instructing haptic feedback. For example, the means for instructing haptic feedback may be implemented by the haptic feedback instruction circuitry 608. In some examples, the haptic feedback instruction circuitry 608 may be instantiated by processor circuitry such as the example processor circuitry 1612 of FIG. 16. For instance, the haptic feedback instruction circuitry 608 may be instantiated by the example general purpose processor circuitry 1800 of FIG. 18 executing machine executable instructions such as that implemented by at least blocks 1308, 1310 of FIG. 13. In some examples, the haptic feedback instruction circuitry 608 may be instantiated by hardware logic circuitry, which may be implemented by an ASIC or the FPGA circuitry 1900 of FIG. 19 structured to perform operations corresponding to the machine readable instructions. Additionally or alternatively, the haptic feedback instruction circuitry 608 may be instantiated by any other combination of hardware, software, and/or firmware. For example, the haptic feedback instruction circuitry 608 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the haptic feedback analysis circuitry 134 of FIG. 1 is illustrated in FIG. 6, one or more of the elements, processes, and/or devices illustrated in FIG. 6 may be combined, divided, re-arranged, omitted, eliminated, and/or implemented in any other way. Further, the example touch control interface circuitry 600, the example touch response area detection interface circuitry 601, the example haptic feedback control interface circuitry 602, the example touch position analysis circuitry 606, the example haptic feedback instruction circuitry 608, and/or, more generally, the example haptic feedback analysis circuitry 134 of FIG. 1, may be implemented by hardware alone or by hardware in combination with software and/or firmware. Thus, for example, any of the example touch control interface circuitry 600, the example touch response area detection interface circuitry 601, the example haptic feedback control interface circuitry 602, the example touch position analysis circuitry 606, the example haptic feedback instruction circuitry 608, and/or, more generally, the example haptic feedback analysis circuitry 134, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example haptic feedback analysis circuitry 134 of FIG. 1 may include one or more elements, processes, and/or devices in addition to, or instead of, those illustrated in FIG. 6, and/or may include more than one of any or all of the illustrated elements, processes, and devices.

Figure 7:
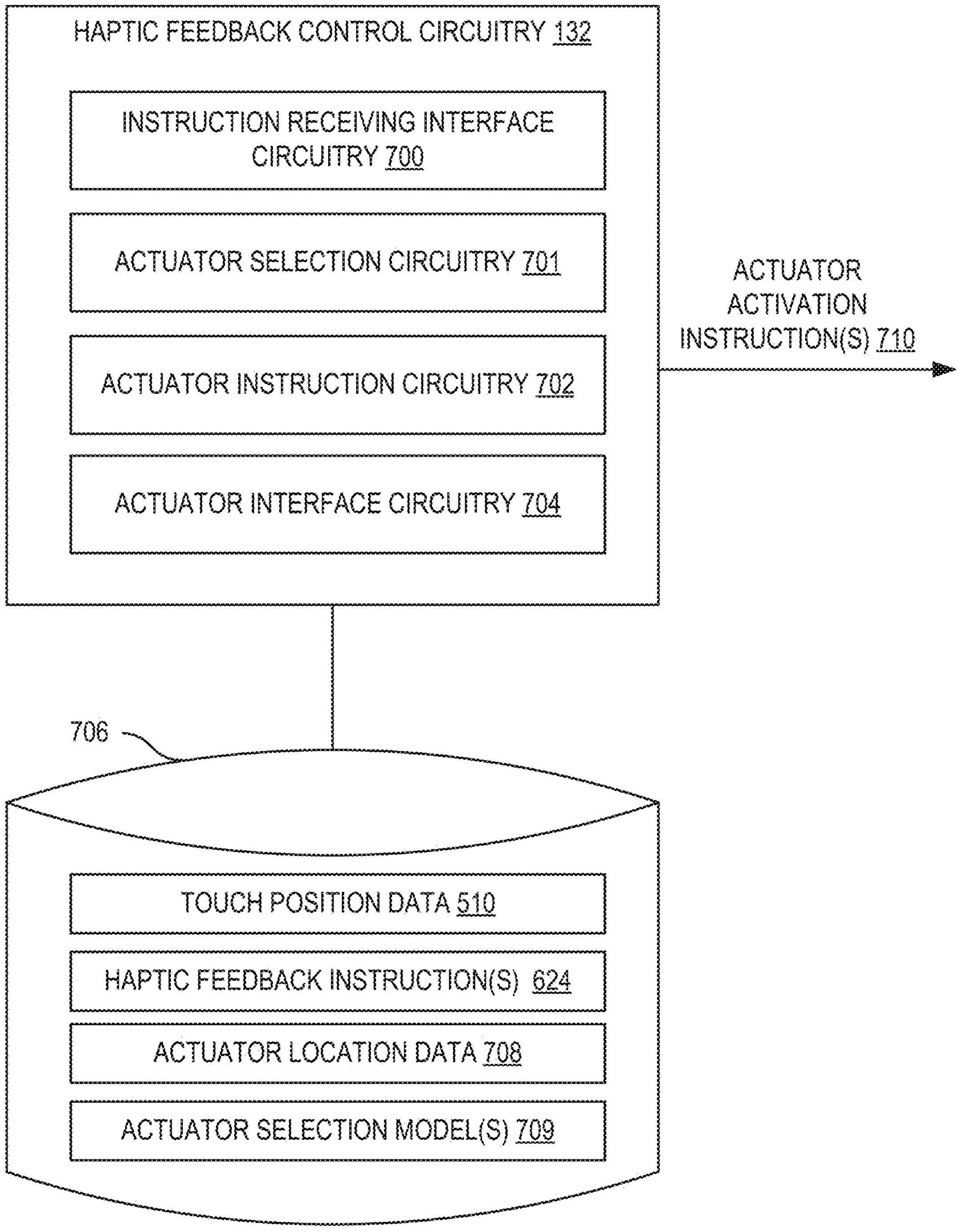
FIG. 7 is a block diagram of an example implementation of the haptic feedback control circuitry of FIG. 1.

FIG. 7 is a block diagram of an example implementation of the haptic feedback control circuitry 132 to cause one or more haptic feedback actuators to generate haptic feedback in response to a touch event on the display screen of a user device. The haptic feedback control circuitry 132 of FIG. 7 may be instantiated (e.g., creating an instance of, bring into being for any length of time, materialize, implement, etc.) by dedicated logic circuitry. The haptic feedback control circuitry 132 of FIG. 7 may be instantiated (e.g., creating an instance of, bring into being for any length of time, materialize, implement, etc.) by processor circuitry such as a central processing unit executing instructions. Additionally or alternatively, the haptic feedback control circuitry 132 of FIG. 7 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 7 may, thus, be instantiated at the same or different times. Some or all of the circuitry may be instantiated, for example, in one or more threads executing concurrently on hardware and/or in series on hardware. Moreover, in some examples, some or all of the circuitry of FIG. 7 may be implemented by one or more virtual machines and/or containers executing on the microprocessor.

The example haptic feedback control circuitry 132 of FIG. 7 includes instruction receiving interface circuitry 700, actuator selection circuitry 701, actuator instruction circuitry 702, and actuator interface circuitry 704.

The instruction receiving interface circuitry 700 of the example haptic feedback control circuitry 132 of FIG. 7 facilitates communication with one or more of the haptic feedback analysis circuitry 134, the touch control circuitry 108, and/or the touch response area detection circuitry 133. For example, the instruction receiving interface circuitry 700 receives of the haptic feedback instruction(s) 524 generated by the haptic feedback instruction circuitry 608 and the touch position data 610 generated by the touch control circuitry 108. The haptic feedback instruction(s) 624 and the touch position data 610 can be stored in a database 706. In some examples, the haptic feedback control circuitry 132 includes the database 706. In some examples, the database 706 is located external to the haptic feedback control circuitry 132 in a location accessible to the haptic feedback control circuitry 132 as shown in FIG. 7.

In response to receipt of the haptic feedback instruction(s) 624 and the touch position data 610, the actuator selection circuitry 701 of the example haptic feedback control circuitry 132 of FIG. 7 identifies the haptic feedback actuator(s) 130, 204 to be activated to generate haptic feedback. The database 706 can include actuator location data 708. The actuator location data 708 includes coordinate or location data for each of the haptic feedback actuators 130, 204 of the display screen 104, 200 relative to the display region 302.

In the example of FIG. 7, the actuator selection circuitry 701 executes one or more actuator selection algorithm(s) or model(s) 709 (e.g., machine-learning model(s)) to select the actuator(s) 130, 204 based on the touch position data 610 for the touch event. As a result of execution of the actuator selection model(s) 709, the actuator selection circuitry 701 identifies which haptic feedback actuator(s) 130, 204 of the display screen 104, 200 should be activated to provide haptic feedback in response to the touch event. For example, the actuator selection circuitry 701 can identify the haptic feedback actuator(s) 130, 204 that are located proximate to (e.g., within a threshold distance of) the location of the touch event based on the touch position data 610, the actuator location data 708, and the actuator selection model(s) 709.

The actuator instruction circuitry 702 of the example haptic feedback control circuitry 132 of FIG. 7 generates actuator activation instruction(s) 710 for the haptic feedback actuator(s) 130, 204 selected by the actuator selection circuitry 701. The instructions can include a frequency and/or amplitude of, for instance, the haptic feedback (e.g., vibrations) to be generated based on the haptic feedback setting(s) included in the haptic feedback instruction(s) 624.

The actuator interface circuitry 704 of the example haptic feedback control circuitry 132 of FIG. 7 outputs the actuator activation instruction(s) 710 to cause the selected actuator(s) 130, 204 to generate the haptic response.

In some examples, the haptic feedback control circuitry 132 includes means for selecting an actuator. For example, the means for selecting an actuator may be implemented by the actuator selection circuitry 701. In some examples, the actuator selection circuitry 701 may be instantiated by processor circuitry such as the example processor circuitry 1712 of FIG. 17. For instance, the actuator selection circuitry 701 may be instantiated by the example general purpose processor circuitry 1800 of FIG. 18 executing machine executable instructions such as that implemented by at least block 1404 of FIG. 14. In some examples, the actuator selection circuitry 701 may be instantiated by hardware logic circuitry, which may be implemented by an ASIC or the FPGA circuitry 1700 of FIG. 17 structured to perform operations corresponding to the machine readable instructions. Additionally or alternatively, the actuator selection circuitry 701 may be instantiated by any other combination of hardware, software, and/or firmware. For example, the actuator selection circuitry 701 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the haptic feedback control circuitry 132 includes means for instructing an actuator. For example, the means for instructing an actuator may be implemented by the actuator instruction circuitry 702. In some examples, the actuator instruction circuitry 702 may be instantiated by processor circuitry such as the example processor circuitry 1712 of FIG. 17. For instance, the actuator instruction circuitry 702 may be instantiated by the example general purpose processor circuitry 1800 of FIG. 18 executing machine executable instructions such as that implemented by at least blocks 1406, 1408 of FIG. 14. In some examples, the actuator instruction circuitry 702 may be instantiated by hardware logic circuitry, which may be implemented by an ASIC or the FPGA circuitry 1900 of FIG. 19 structured to perform operations corresponding to the machine readable instructions. Additionally or alternatively, the actuator instruction circuitry 702 may be instantiated by any other combination of hardware, software, and/or firmware. For example, the actuator instruction circuitry 702 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the haptic feedback control circuitry 132 of FIG. 1 is illustrated in FIG. 7, one or more of the elements, processes, and/or devices illustrated in FIG. 7 may be combined, divided, re-arranged, omitted, eliminated, and/or implemented in any other way. Further, the example instruction receiving circuitry 700, the example actuator selection circuitry 701, the example actuator instruction circuitry 702, the example actuator interface circuitry 704, and/or, more generally, the example haptic feedback control circuitry 132 of FIG. 1, may be implemented by hardware alone or by hardware in combination with software and/or firmware. Thus, for example, any of the example instruction receiving circuitry 700, the example actuator selection circuitry 701, the example actuator instruction circuitry 702, the example actuator interface circuitry 704, and/or, more generally, the example haptic feedback control circuitry 132, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example haptic feedback control circuitry 132 of FIG. 1 may include one or more elements, processes, and/or devices in addition to, or instead of, those illustrated in FIG. 7, and/or may include more than one of any or all of the illustrated elements, processes, and devices.

FIGS. 8-11 are flow diagrams illustrating example data exchanges between the touch control circuitry 108, the touch response area detection circuitry 133, the haptic feedback analysis circuitry 134, and the haptic feedback control circuitry 132 of the example user device 102 of FIG. 1.

Figure 8:
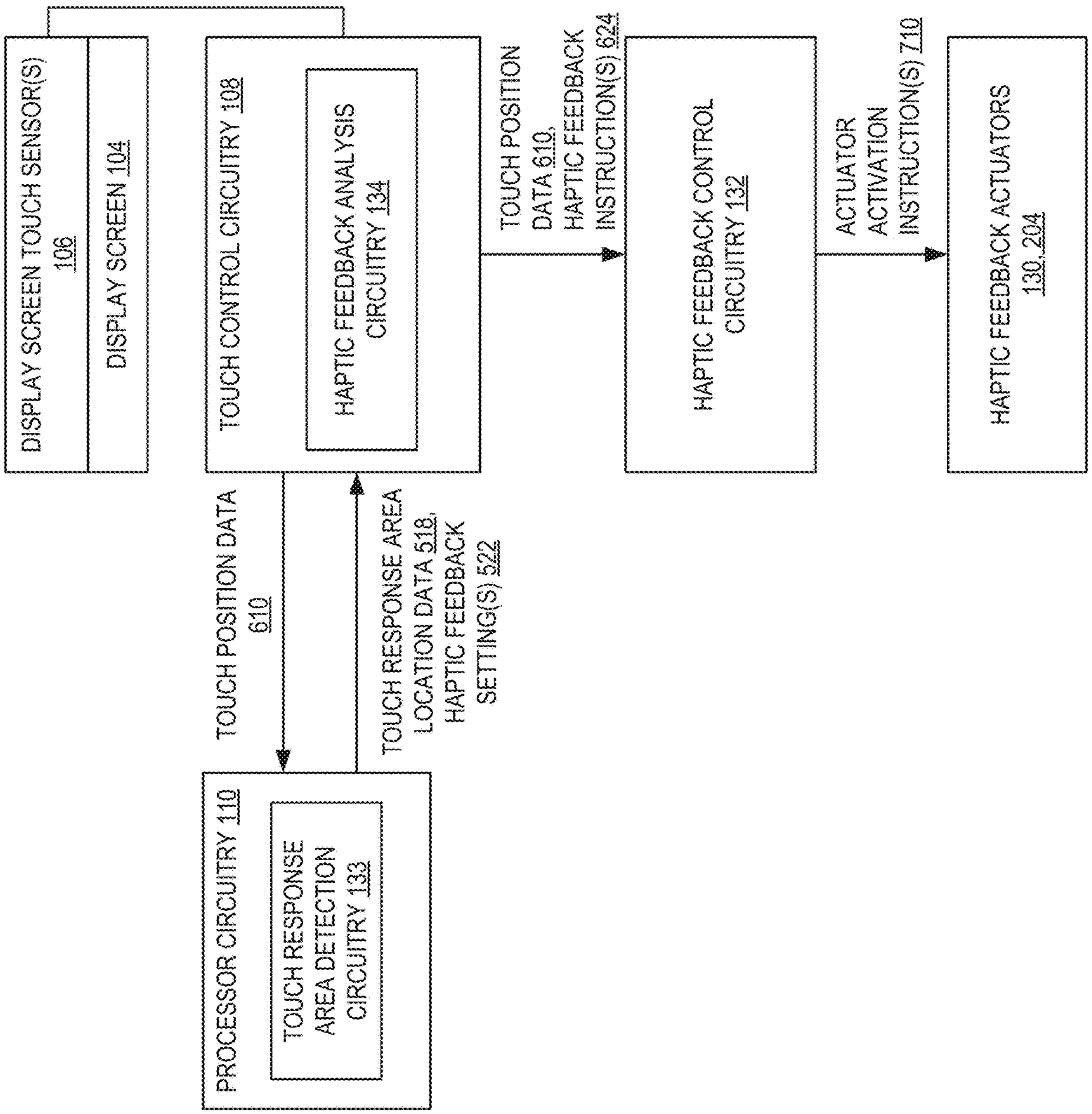
FIGS. 8-11 are communication diagrams showing example data exchanges between the touch control circuitry, the touch response area detection circuitry of FIGS. 1 and/or 5, the haptic feedback analysis circuitry of FIGS. 1 and/or 6, and the haptic feedback control circuitry of FIGS. 1 and/or 7 in accordance with teachings of this disclosure

FIG. 8 is a flow diagram illustrating a first example data exchange between the touch control circuitry 108, the touch response area detection circuitry 133, the haptic feedback analysis circuitry 134, and the haptic feedback control circuitry 132. In the example of FIG. 8, the haptic feedback analysis circuitry 134 is implemented by the touch control circuitry 108.

As disclosed herein, the touch control circuitry 108 generates touch position data 610 in response to touch event(s) on the display screen 104, 200 and indicative of location(s) or coordinate(s) of the touch event(s) detected by the display screen touch sensor(s) 106 on the display screen 104, 200. In the example of FIG. 8, the touch control circuitry 108 transmits the touch position data 610 to the haptic feedback analysis circuitry 134. Also, in FIG. 8, the touch control circuitry 108 transmits the touch position data 610 to the processor circuitry 110 (e.g., the operating system 116), where the processor circuitry 110 can interpret and respond to the input(s) (e.g., commands) represented by the touch position data.

The touch response area analysis circuitry 506 of the touch response area detection circuitry 133 of FIG. 5 identifies or defines touch response area(s) 304 in the display region 302 of the display screen 104, 200. The touch response area detection circuitry 133 transmits the touch response area location data 518 and the haptic feedback setting(s) 522 to the haptic feedback analysis circuitry 134.

The touch position analysis circuitry 606 of the haptic feedback analysis circuitry 134 of FIG. 6 analyzes the touch position data 610 to determine if the touch event occurred within the touch response area 304. If touch position analysis circuitry 606 determines that the touch event occurred within the touch response area, the haptic feedback instruction circuitry 608 of FIG. 6 generates the haptic feedback instruction(s) 624 including, for example, the user setting(s) for the haptic feedback to be generated (e.g., strength of the vibrations, duration of the vibrations).

In the example of FIG. 8, in response to touch event(s) detected by the touch control circuitry 108, the touch control circuitry 108 sends an interrupt signal to the haptic feedback control circuitry 132 to cause the haptic feedback control circuitry 132 to obtain the touch position data 610. Also, the haptic feedback instruction circuitry 608 transmits the haptic feedback instructions 624 to the haptic feedback control circuitry 132. In response to the receipt of the touch position data 610 and the haptic feedback instructions 624, the actuator selection circuitry 701 of the haptic feedback control circuitry of FIG. 7 identifies the haptic feedback actuator(s) 130, 204 to be activated. The actuator instruction circuitry 702 of FIG. 7 generates the actuator activation instruction(s) 710 to be output to cause the selected haptic feedback actuator(s) 130, 204 to generate the haptic feedback (e.g., vibrations).

Figure 9:
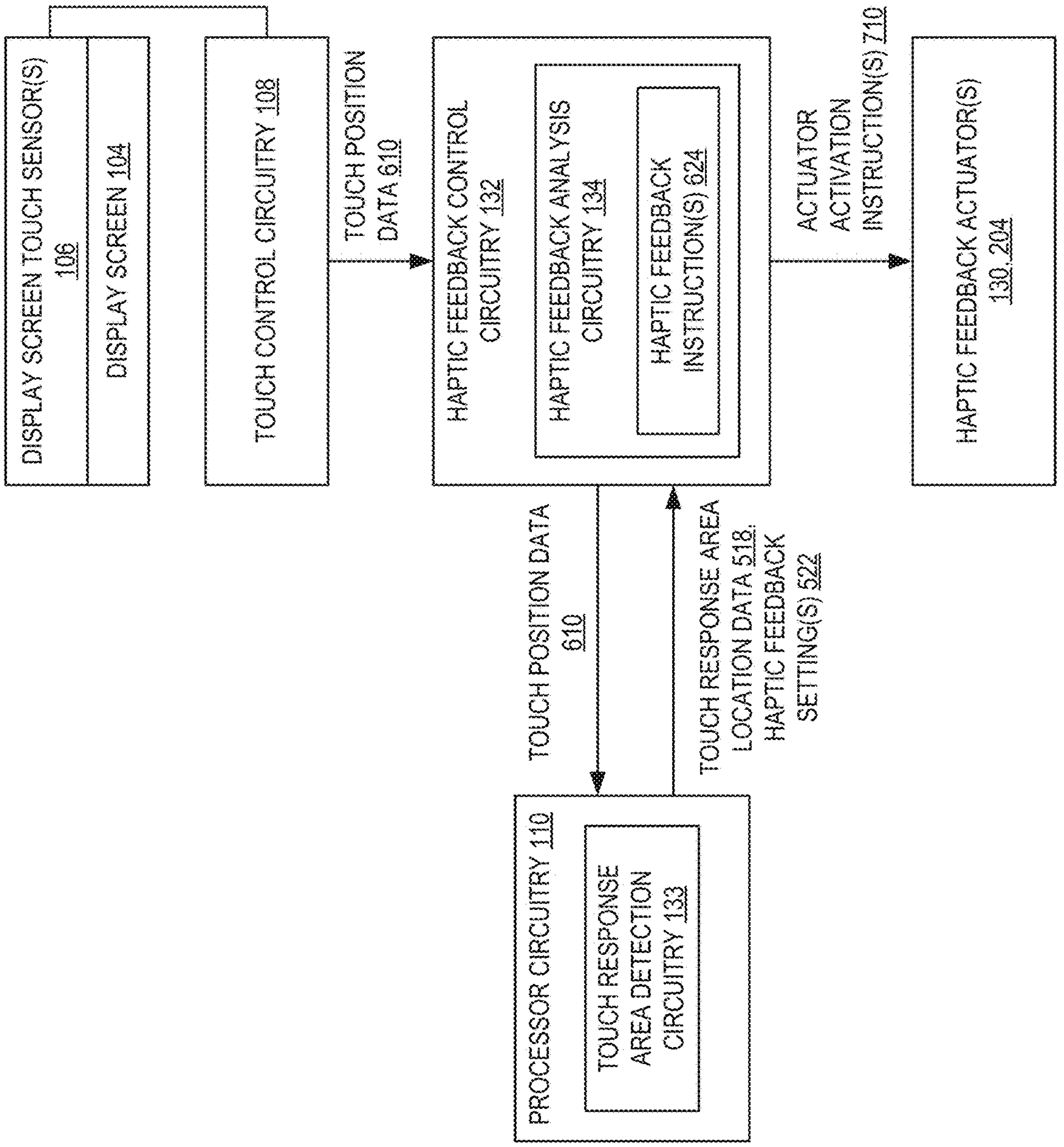

FIG. 9 is a flow diagram illustrating a second example data exchange between the touch control circuitry 108, the touch response area detection circuitry 133, the haptic feedback analysis circuitry 134, and the haptic feedback control circuitry 132. In the example of FIG. 9, the haptic feedback analysis circuitry 134 is implemented by the haptic feedback control circuitry 132.

In the example of FIG. 9, in response to touch event(s) detected by the touch control circuitry 108, the touch control circuitry 108 sends an interrupt signal to the haptic feedback control circuitry 132 to cause the haptic feedback control circuitry 132 to obtain the touch position data 610. In the example of FIG. 9, the touch control circuitry 108 transmits the touch position data 610 to the haptic feedback control circuitry 132. The haptic feedback control circuitry 132 passes the touch position data 610 to the haptic feedback analysis circuitry 134. Also, in FIG. 9, the haptic feedback control circuitry 132 transmits the touch position data 610 to the processor circuitry 110 (e.g., the operating system 116) for interpretation and response to the input(s) (e.g., commands) represented by the touch position data.

The touch response area analysis circuitry 506 of the touch response area detection circuitry 133 of FIG. 5 identifies or defines touch response area(s) 304 in the display region 302 of the display screen 104, 200. The touch response area detection circuitry 133 transmits the touch response area location data 518 and the haptic feedback setting(s) 522 to the haptic feedback analysis circuitry 134.

The touch position analysis circuitry 606 of the haptic feedback analysis circuitry 134 of FIG. 6 analyzes the touch position data 610 to determine if the touch event occurred within the touch response area 304. If touch position analysis circuitry 606 determines that the touch event occurred within the touch response area, the haptic feedback instruction circuitry 608 of FIG. 6 generates the haptic feedback instruction(s) 624 including the user setting(s) for the haptic feedback to be generated. In the example of FIG. 9, the actuator selection circuitry 701 of the haptic feedback control circuitry 132 analyzes the touch position data 610 and the haptic feedback instruction(s) 524 to generate the actuator activation instruction(s) 710. The haptic feedback control circuitry 132 outputs the instruction(s) 710 to cause the haptic feedback actuator(s) 130, 204 to generate the haptic feedback.

Figure 10:
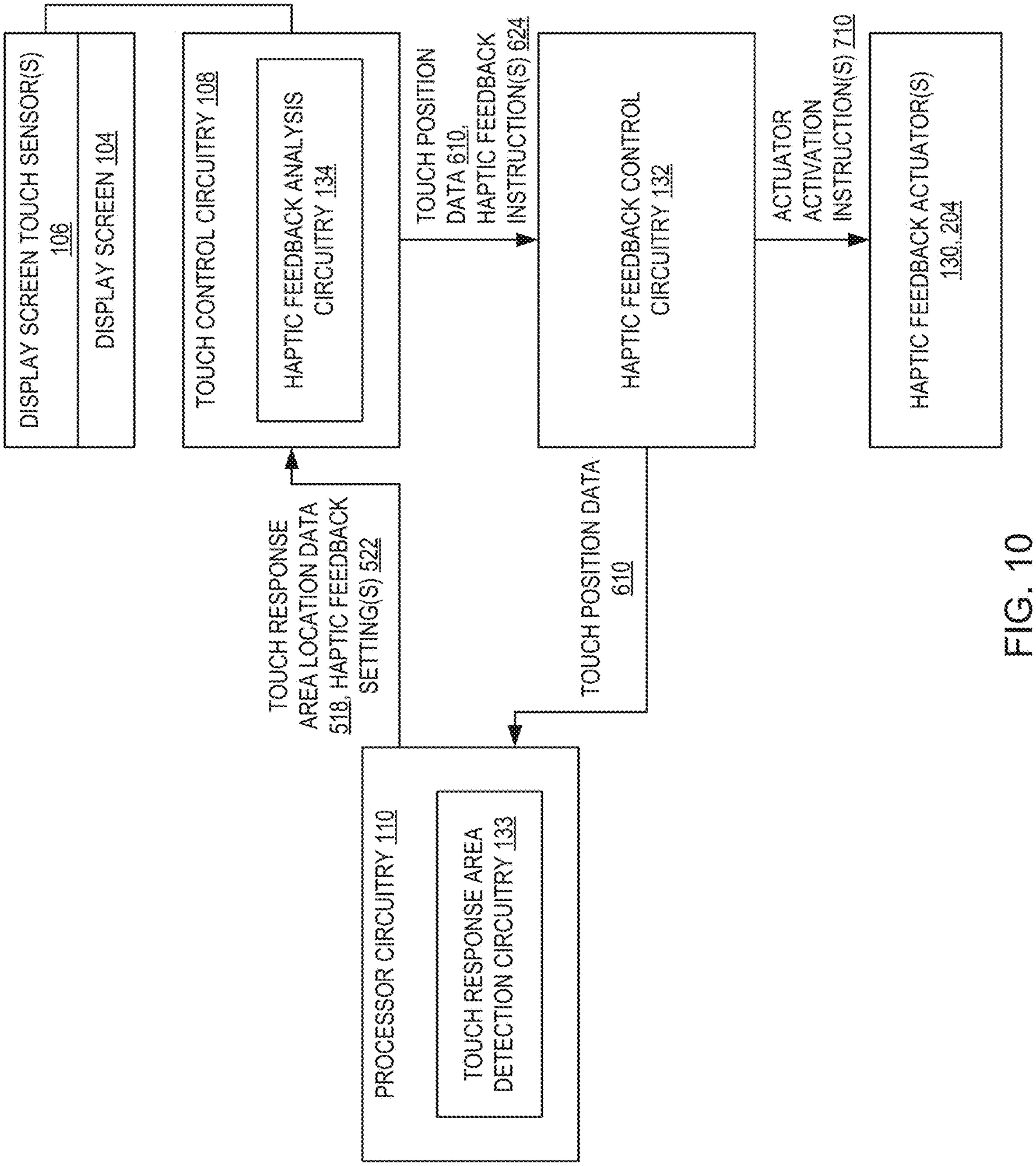

FIG. 10 is a flow diagram illustrating a third example data exchange between the touch control circuitry 108, the touch response area detection circuitry 133, the haptic feedback analysis circuitry 134, and the haptic feedback control circuitry 132. In the example of FIG. 10, the haptic feedback analysis circuitry 134 is implemented by the touch control circuitry 108.

In the example of FIG. 10, in response to touch event(s) detected by the touch control circuitry 108, the touch control circuitry 108 sends an interrupt signal to the haptic feedback control circuitry 132 to cause the haptic feedback control circuitry 132 to obtain the touch position data 610. In the example of FIG. 10, the haptic feedback control circuitry 132 transmits the touch position data 610 to the processor circuitry 110 (e.g., the operating system 116).

The touch response area analysis circuitry 506 of the touch response area detection circuitry 133 of FIG. 5 identifies or defines touch response area(s) 304 in the display region 302 of the display screen 104, 200. The touch response area detection circuitry 133 transmits the touch response area location data 518 and the haptic feedback setting(s) 522 to the haptic feedback analysis circuitry 134.

The touch position analysis circuitry 606 of the haptic feedback analysis circuitry 134 of FIG. 6 analyzes the touch position data 610 to determine if the touch event occurred within the touch response area 304. If touch position analysis circuitry 606 determines that the touch event occurred within the touch response area, the haptic feedback instruction circuitry 608 of FIG. 6 generates the haptic feedback instruction(s) 624 including the user settings for the haptic feedback to be generated. In the example of FIG. 9, the haptic feedback analysis circuitry 134 transmits the haptic feedback instruction(s) 624 to the haptic feedback control circuitry 132. The haptic feedback control circuitry 132 analyzes the touch position data 610 and the haptic feedback instruction(s) 624 to generate the actuator activation instruction(s) 710. The haptic feedback control circuitry 132 outputs the instruction(s) 710 to cause the haptic feedback actuator(s) 130, 204 to generate the haptic feedback.

Figure 11:
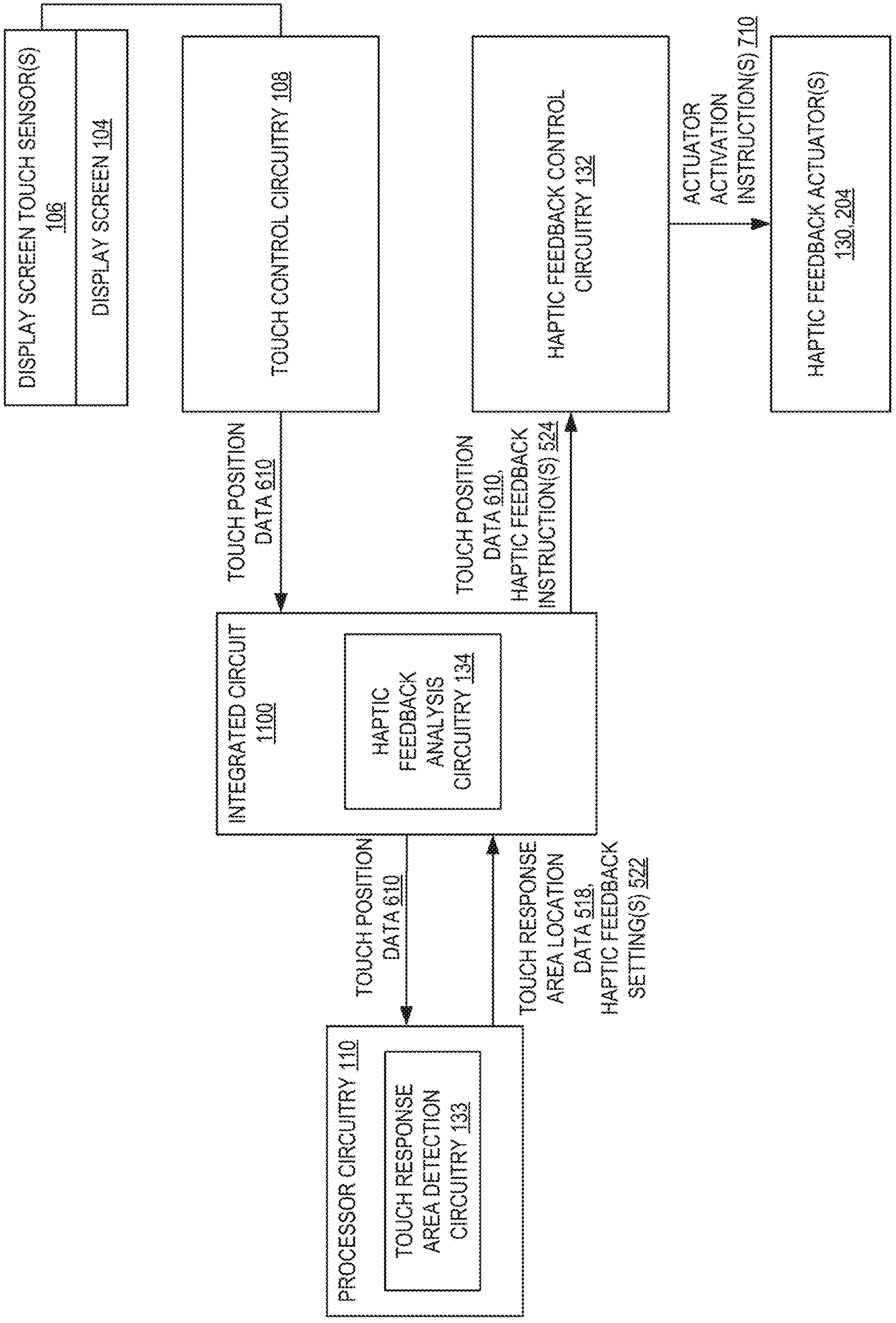

FIG. 11 is a flow diagram illustrating a fourth example data exchange between the touch control circuitry 108, the touch response area detection circuitry 133, the haptic feedback analysis circuitry 134, and the haptic feedback control circuitry 132. In the example of FIG. 11, the haptic feedback analysis circuitry 134 is implemented by an integrated circuit 1100. In some examples, the integrated circuit 1100, the touch control circuitry 108, and the haptic feedback control circuitry 132 could be located in a lid of a mobile computing device such as a laptop and the processor circuitry 110 could be located in a base of the laptop.

In the example of FIG. 11, in response to touch event(s) detected by the touch control circuitry 108, the touch control circuitry 108 sends an interrupt signal to the integrated circuit 1100 to cause the integrated circuit 1100 to obtain the touch position data 610. The integrated circuit 1100 transmits the touch position data to the processor circuitry (e.g., the operating system 116).

The touch response area analysis circuitry 506 of the touch response area detection circuitry 133 of FIG. 5 identifies or defines touch response area(s) 304 in the display region 302 of the display screen 104, 200. The touch response area detection circuitry 133 transmits the touch response area location data 518 and the haptic feedback setting(s) 522 to the haptic feedback analysis circuitry 134.

The touch position analysis circuitry 606 of the haptic feedback analysis circuitry 134 of FIG. 6 analyzes the touch position data 610 to determine if the touch event occurred within the touch response area 304. If touch position analysis circuitry 606 determines that the touch event occurred within the touch response area, the haptic feedback instruction circuitry 608 of FIG. 6 generates the haptic feedback instruction(s) 624 including the user settings for the haptic feedback to be generated. In the example of FIG. 11, the haptic feedback analysis circuitry 134 transmits the touch position data 610 and the haptic feedback instruction(s) 624 to the haptic feedback control circuitry 132.

The haptic feedback control circuitry 132 analyzes the touch position data 610 and the haptic feedback instruction(s) 624 to generate the actuator activation instruction(s) 710. The haptic feedback control circuitry 132 outputs the instruction(s) 710 to cause the haptic feedback actuator(s) 130, 204 to generate the haptic feedback.

Thus, the example flow diagrams of FIGS. 8-11 illustrate different flow paths for the exchange of data between the touch control circuitry 108, the touch response area detection circuitry 133, the haptic feedback analysis circuitry 134, and the haptic feedback control circuitry 132. One or more of the flow paths of FIGS. 8-11 can be implemented at the user device 102 based on, for instance, available computing resources associated with the touch control circuitry 108, the haptic feedback analysis circuitry 134, and/or the haptic feedback control circuitry 132. For example, the data exchange illustrated in FIG. 11 in which the analyzing of the touch position data 610 relative to the touch response area location data 518 and the generating of the haptic feedback instruction(s) 624 is performed at the integrated circuit 1100 can offload processing resources from the (e.g., main) processor circuitry 110, the touch control circuitry 108, and/or the haptic feedback control circuitry 132 of the user device 102. In some examples, implementing the haptic feedback analysis circuitry 134 at the integrated circuit 1100, the touch control circuitry 108, or the haptic feedback control circuitry 132 reduces latencies in providing the haptic feedback outputs.

Although examples disclosed herein are discussed in connection with the touch position data 610 generated by the touch control circuitry, in some examples, the haptic feedback control circuitry 132 can detect forces exerted on the actuator(s) 204 in response to touch event(s) and estimate a position of the touch event based on force data generated by the actuators(s) 204. In such examples, the haptic feedback control circuitry 132 can determine if the touch event(s) occurred within the touch response area(s) 304 (e.g., based on previously identified touch response area(s) 304) select particular ones of the actuator(s) 204 to output the haptic feedback. The haptic feedback control circuitry 132 can adjust or correct the actuator(s) 204 selected to output the haptic feedback when the haptic feedback control circuitry 132 receives the haptic feedback instruction(s) 624 from the haptic feedback analysis circuitry 134 generated based on the touch position data 610.

Figure 12:
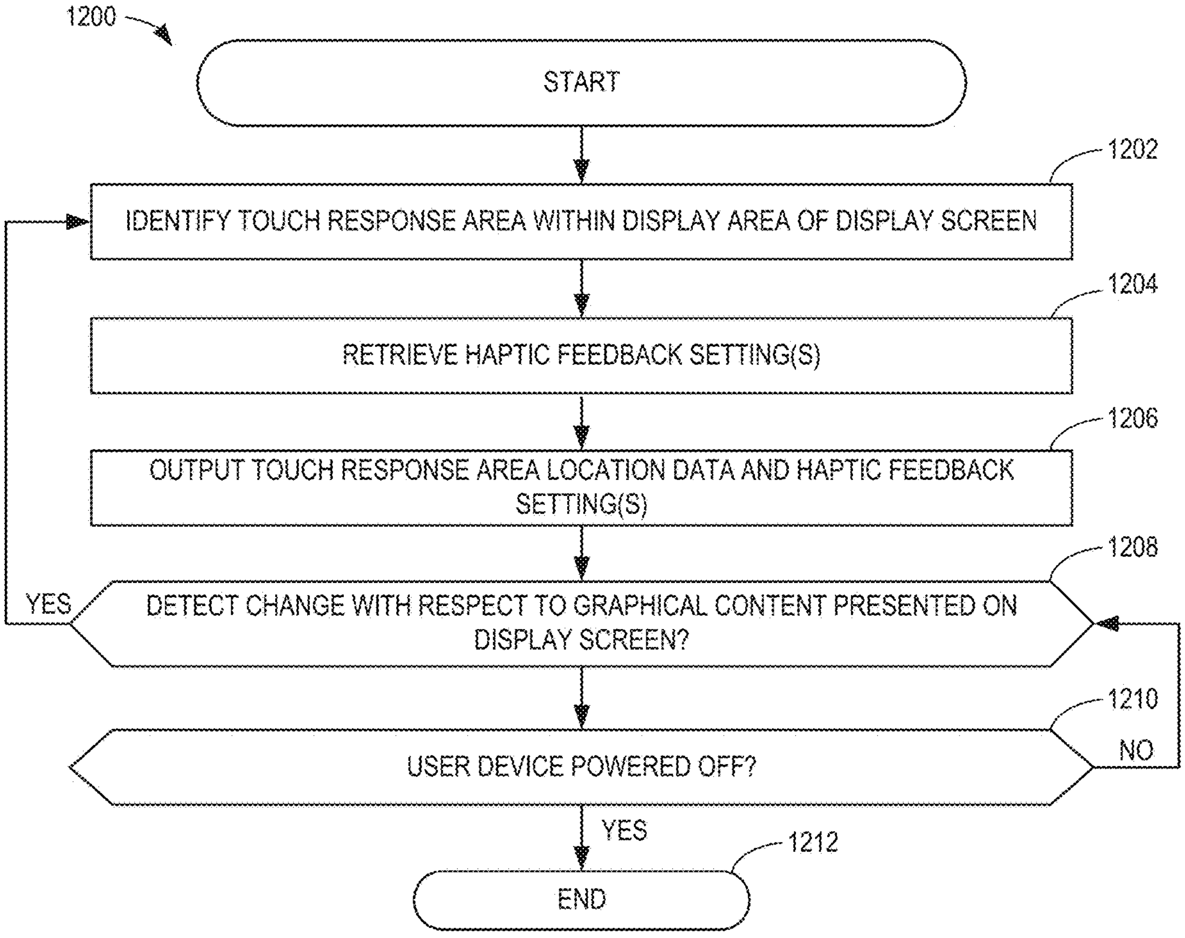
FIG. 12 is a flowchart representative of example machine readable instructions and/or example operations that may be executed by example processor circuitry to implement the example touch response area detection circuitry of FIG. 5.
Figure 13:
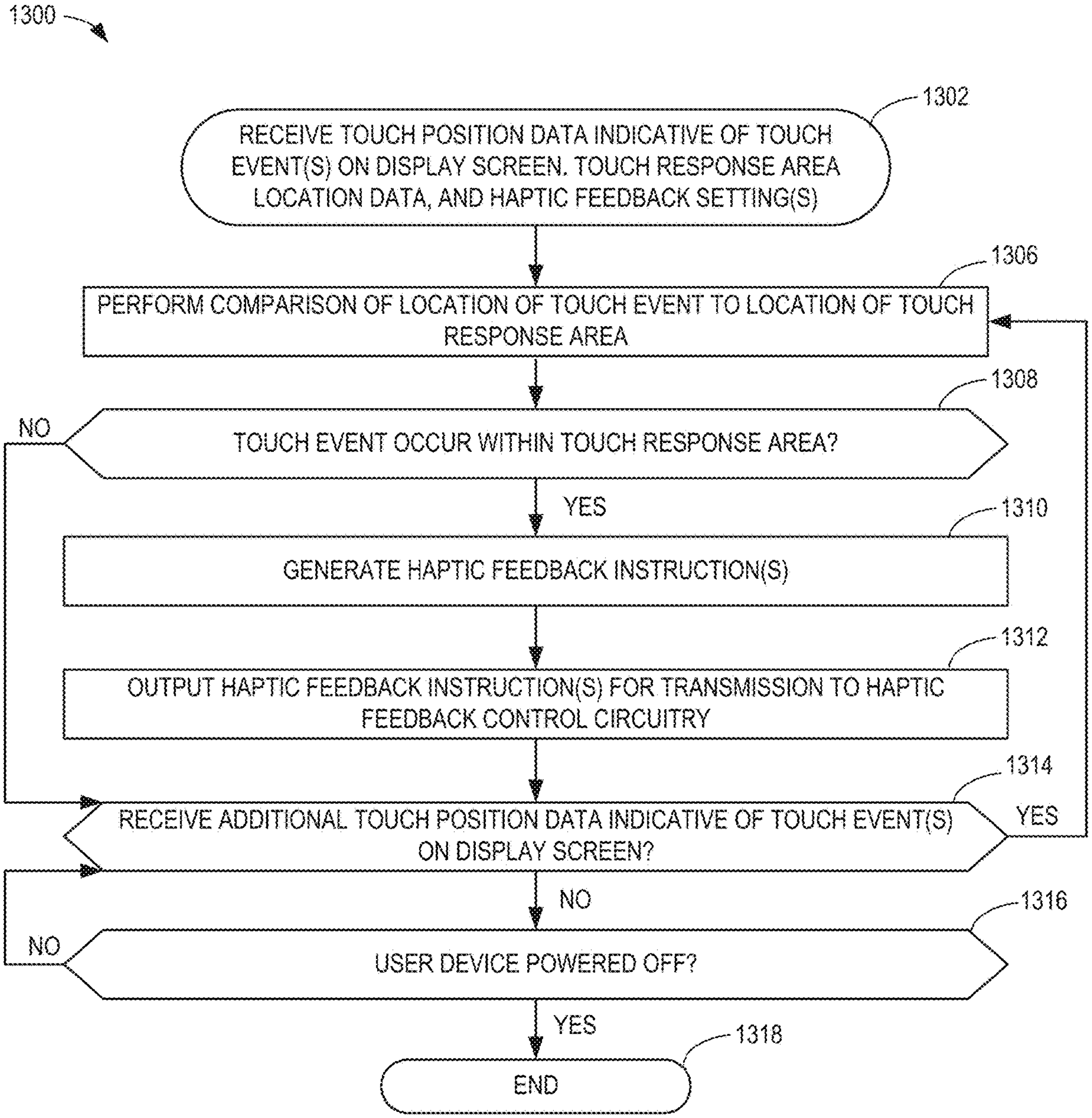
FIG. 13 is a flowchart representative of example machine readable instructions and/or example operations that may be executed by example processor circuitry to implement the example haptic feedback analysis circuitry of FIG. 6.
Figure 14:
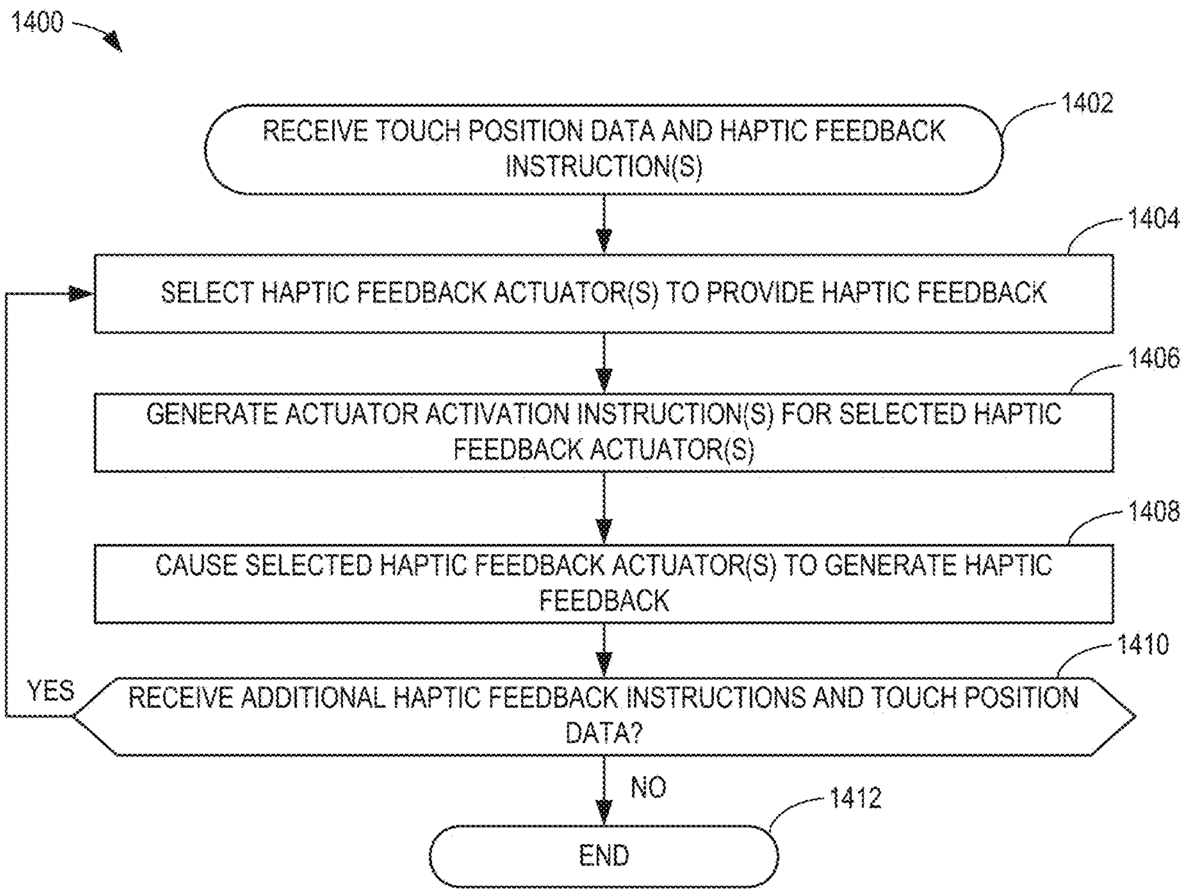
FIG. 14 is a flowchart representative of example machine readable instructions and/or example operations that may be executed by example processor circuitry to implement the example haptic feedback control circuitry of FIG. 7.

A flowchart representative of example hardware logic circuitry, machine readable instructions, hardware implemented state machines, and/or any combination thereof for implementing the touch response area detection circuitry 133 of FIG. 5 is shown in FIG. 12. A flowchart representative of example hardware logic circuitry, machine readable instructions, hardware implemented state machines, and/or any combination thereof for implementing the haptic feedback analysis circuitry 134 of FIG. 6 is shown in FIG. 13. A flowchart representative of example hardware logic circuitry, machine readable instructions, hardware implemented state machines, and/or any combination thereof for implementing the haptic feedback control circuitry 132 of FIG. 7 is shown in FIG. 14. The machine readable instructions may be one or more executable programs or portion(s) of an executable program for execution by processor circuitry, such as the processor circuitry 1312, 1412 shown in the example processor platforms 1300, 1400 discussed below in connection with FIGS. 13 and 14 and/or the example processor circuitry discussed below in connection with FIGS. 15 and/or 16. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11 and 12, many other methods of implementing the example haptic feedback analysis circuitry 134 and/or the example haptic feedback control circuitry 132 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 11 and 12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 12 is a flowchart representative of example machine readable instructions and/or example operations 1200 that may be executed and/or instantiated by processor circuitry to identify touch response area(s) of a display region of a display screen.

The machine readable instructions and/or the operations 1200 of FIG. 12 begin at block 1202, at which the touch response area analysis circuitry 506 identifies the touch response area 304 of the display region 302 of the display screen 104, 200. For example, the touch response area analysis circuitry 506 can identify the touch response area 304 based on graphical content data 514 obtained from the operating system 116 and/or the application(s) 118 that identifies characteristics (e.g., size, position) of graphical content associated with touch input(s) such as a virtual keyboard. In some examples, touch response area analysis circuitry 506 identifies the touch response area(s) 304 based on the touch response area detection rule(s) 516 for particular application(s) 118 and/or based on analysis of display frame(s) presented at the time of the touch event(s).

At block 1204, the touch response area analysis circuitry 506 retrieves haptic feedback settings for the application(s) 118 and/or the operating system 116 associated with the touch response area(s).

At block 1206, the touch response area analysis circuitry 506 outputs the touch response area location data 518 and the haptic feedback setting(s) 522 for transmission to the haptic feedback analysis circuitry 134.

At block 1208, the touch response area analysis circuitry 506 determines if there have been change(s) with respect to graphical content presented on the display screen 104, 200, where the graphical content can receive user inputs (e.g., a virtual keyboard). The change(s) in the graphical content can include, for example a position of the graphical content in the display region 302 due to user manipulation, new content, a different application, etc. If there has been a change with respect to the graphical content, the touch response area analysis circuitry 506 determines if the touch response area(s) 304 have changed (block 1102).

The example instructions 1200 of FIG. 12 end when the user device 102 is powered off (blocks 1210, 1212).

FIG. 13 is a flowchart representative of example machine readable instructions and/or example operations 1300 that may be executed and/or instantiated by processor circuitry to identify touch events on a display screen relative to a touch response area for providing haptic feedback. The machine readable instructions and/or the operations 1300 of FIG. 13 begin at block 1302, at which the touch control interface circuitry 600 of the haptic feedback analysis circuitry 134 of FIG. 6 receives touch position data 610 indicative of a touch event on the display screen 104, 200 of the user device 102 and the touch response area detection interface circuitry 601 receives the touch response area location data 518 and the haptic feedback setting(s) 522 from the touch response area detection circuitry 133. The touch position data 610, the touch response area location data 518, and the haptic feedback setting(s) 522 can be transmitted to the haptic feedback analysis circuitry 134 via one of the data exchange flow paths shown in FIGS. 8-11.

At block 1306, the touch position analysis circuitry 606 compares the location of the touch event defined in the touch position data 610 to the location(s) of the touch response area(s) 304 identified in the touch response area location data 518. The touch position analysis circuitry 606 generates instructions indicating whether the touch event occurred within the touch response area(s) 304 or outside of the touch response area(s) 304.

At block 1308, the haptic feedback instruction circuitry 608 determines if the touch event occurred within the touch response area 304 or outside of the touch response area 304. If the touch event did not occur within the touch response area 304, the haptic feedback instruction circuitry 608 determines that a haptic feedback response should not be provided for the touch event.

If the touch event occurred within the touch response area 304, then at block 1310, the haptic feedback instruction circuitry 608 generates the haptic feedback instruction(s) or report(s) 624. The haptic feedback instruction(s) or report(s) 624 inform the haptic feedback control circuitry 132 that the touch event is received in the touch response area and include user settings for the haptic feedback to be generated by the haptic feedback actuator(s) 130, 204, such as a strength and/or duration of the haptic feedback (e.g., vibrations).

At block 1312, the haptic feedback instruction circuitry 608 causes the haptic feedback instruction(s) 624 to be output to the haptic feedback control circuitry 132 via one of the data exchange flow paths of FIGS. 8-11 (e.g., via the haptic feedback control interface circuitry 602, via the touch control circuitry 108, etc.). The example instructions 1300 of FIG. 13 end when no further touch position data has been received and the user device 102 is powered off (blocks 1314, 1316, 1318).

FIG. 14 is a flowchart representative of example machine readable instructions and/or example operations 1200 that may be executed and/or instantiated by processor circuitry to cause one or more haptic feedback actuators to generate haptic feedback in response to a touch event on the display screen of a user device. The machine readable instructions and/or the operations 1400 of FIG. 14 begin at block 1402, at which the instruction receiving interface circuitry 700 receives the touch position data 610 and the haptic feedback instruction(s) 624 via one of the data exchange flow paths of FIGS. 8-11.

At block 1404, the actuator selection circuitry 701 executes the actuator selection model(s) 709 to select or identify which haptic feedback actuator(s) 130, 204 should be activated to provide haptic feedback in response to the touch event. For example, the actuator selection circuitry 701 can identify the haptic feedback actuator(s) 130, 204 that are located within a threshold distance of the location of the touch event based on the touch position data 610, the actuator location data 708, and the actuator selection model(s) 709.

At block 1406, the actuator instruction circuitry 702 generates the actuator activation instruction(s) 710 for the selected haptic feedback actuator(s) 130, 204. The actuator activation instruction(s) 710 can include instructions regarding, for example, a frequency and/or amplitude of the haptic feedback based on the haptic feedback setting(s) identified in the haptic feedback instruction(s) 624.

At block 1408, the actuator interface circuitry 704 outputs the actuator activation instruction(s) 710 to the selected actuator(s) 130, 204 to cause the actuator(s) 130, 204 to generate the haptic feedback. The example instructions of FIG. 14 end when no further haptic feedback instruction(s) 624 and touch position data 610 has been received (blocks 1410, 1412).

Figure 15:
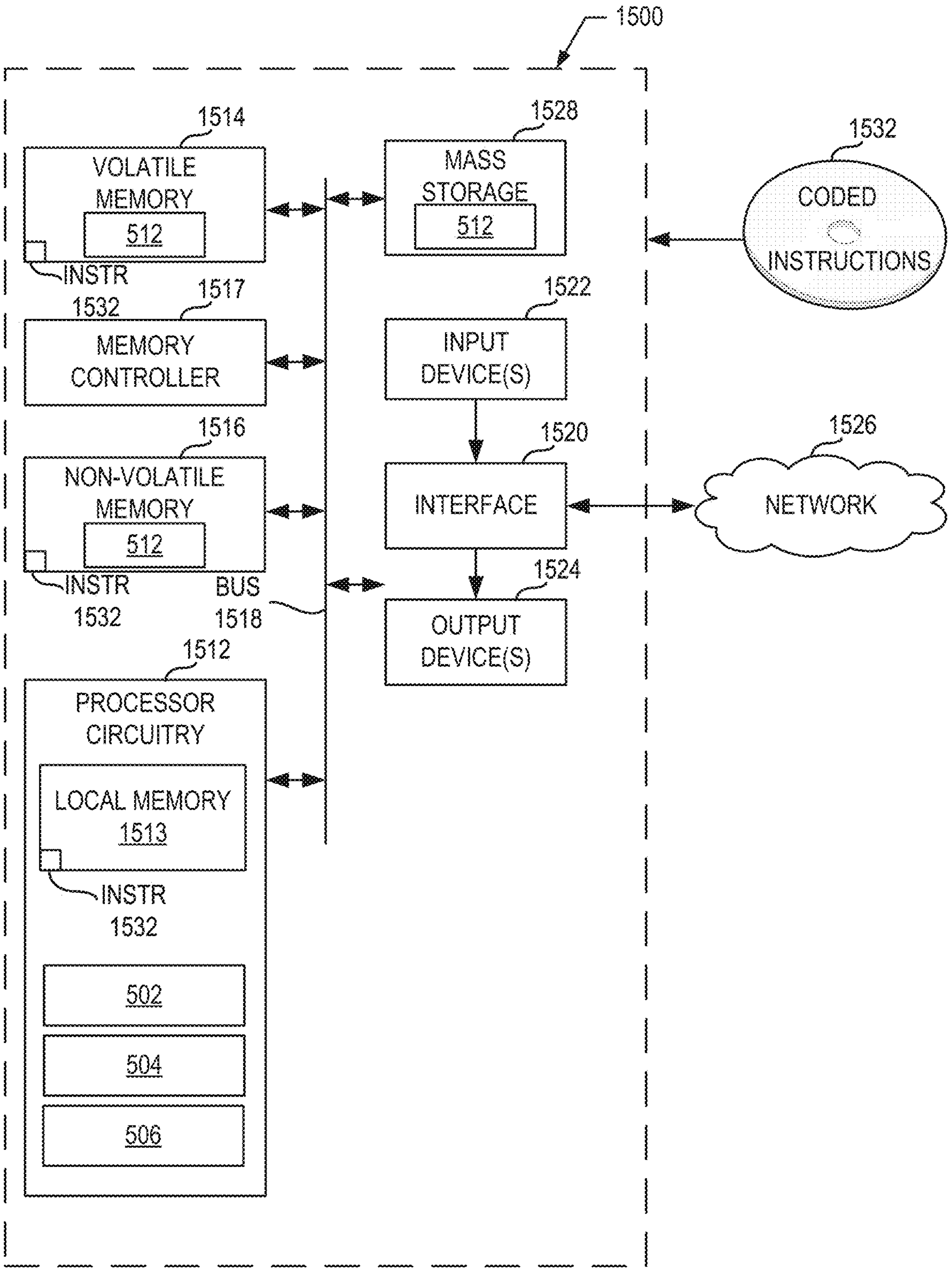
FIG. 15 is a block diagram of an example processing platform including processor circuitry structured to execute the example machine readable instructions and/or the example operations of FIG. 12 to implement the example touch response area detection circuitry of FIG. 5.

FIG. 15 is a block diagram of an example processor platform 1300 structured to execute and/or instantiate the machine readable instructions and/or the operations of FIG. 12 to implement the touch response area detection circuitry 133 of FIG. 5. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1500 of the illustrated example includes processor circuitry 1512. The processor circuitry 1512 of the illustrated example is hardware. For example, the processor circuitry 1512 can be implemented by one or more integrated circuits, logic circuits, FPGAs, microprocessors, CPUs, GPUs, DSPs, and/or microcontrollers from any desired family or manufacturer. The processor circuitry 1512 may be implemented by one or more semiconductor based (e.g., silicon based) devices. In this example, the processor circuitry 1512 implements the example OS/application interface circuitry 502, the example haptic feedback analysis interface circuitry 504, and the example touch response area analysis circuitry 506.

The processor circuitry 1512 of the illustrated example includes a local memory 1513 (e.g., a cache, registers, etc.). The processor circuitry 1512 of the illustrated example is in communication with a main memory including a volatile memory 1514 and a non-volatile memory 1516 by a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1516 may be implemented by flash memory and/or any other desired type of memory device. Access to the main memory 1514, 1516 of the illustrated example is controlled by a memory controller 1517.

The processor platform 1500 of the illustrated example also includes interface circuitry 1520. The interface circuitry 1520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1522 are connected to the interface circuitry 1520. The input device(s) 1522 permit(s) a user to enter data and/or commands into the processor circuitry 1512. The input device(s) 1522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuitry 1520 of the illustrated example. The output device(s) 1524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1520 of the illustrated example, thus, typically includes a graphics driver card, a graphics driver chip, and/or graphics processor circuitry such as a GPU.

The interface circuitry 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1500 of the illustrated example also includes one or more mass storage devices 1528 to store software and/or data. Examples of such mass storage devices 1528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1532, which may be implemented by the machine readable instructions of FIG. 12, may be stored in the mass storage device 1528, in the volatile memory 1414, in the non-volatile memory 1516, and/or on a removable non-transitory computer readable storage medium such as a CD or DVD.

Figure 16:
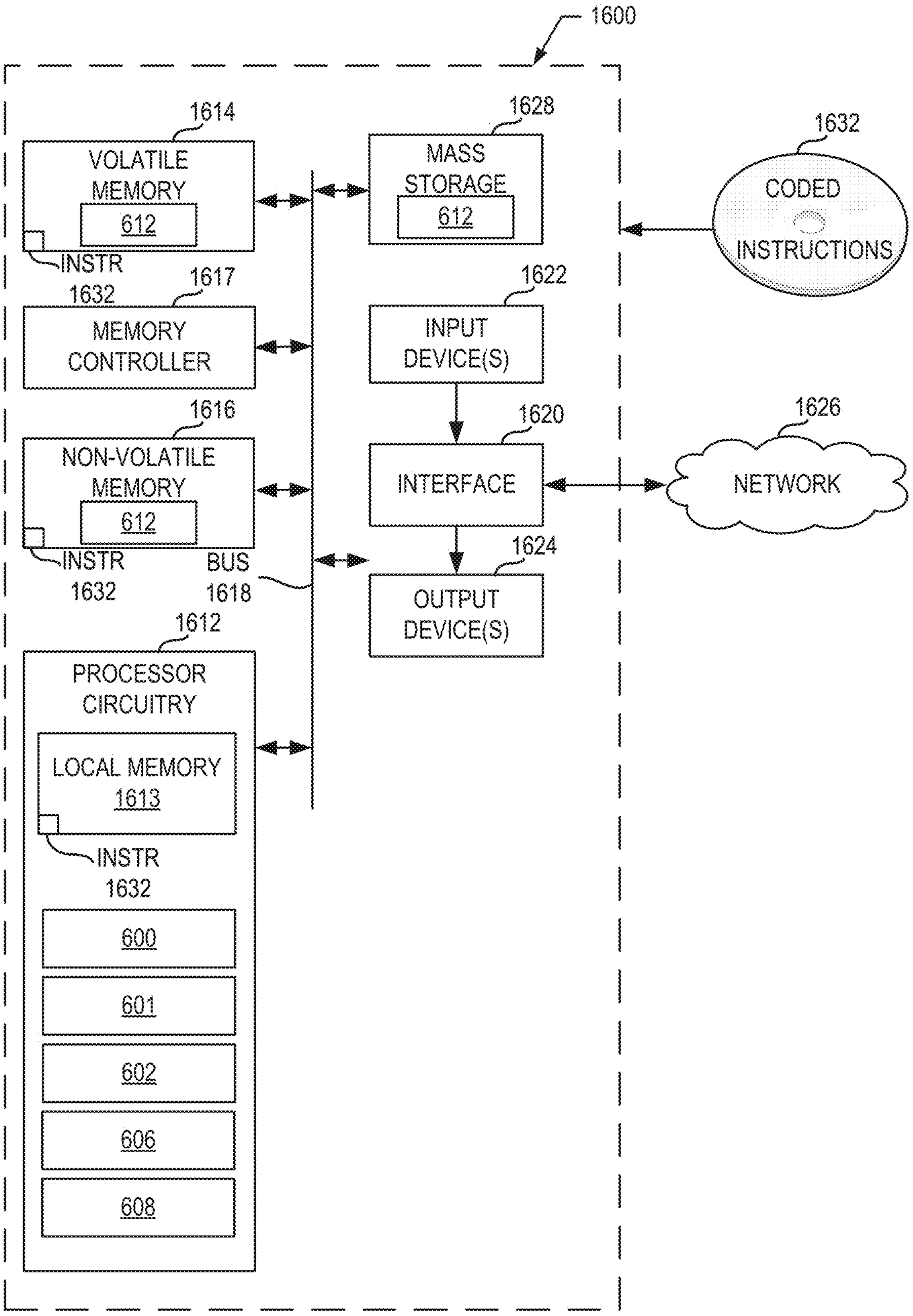
FIG. 16 is a block diagram of an example processing platform including processor circuitry structured to execute the example machine readable instructions and/or the example operations of FIG. 13 to implement the example haptic feedback analysis circuitry of FIG. 6.

FIG. 16 is a block diagram of an example processor platform 1600 structured to execute and/or instantiate the machine readable instructions and/or the operations of FIG. 13 to implement the haptic feedback analysis circuitry 134 of FIG. 6. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1600 of the illustrated example includes processor circuitry 1612. The processor circuitry 1612 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements the example touch control interface circuitry 600, the example touch response area detection interface circuitry 601, the example haptic feedback control interface circuitry 602, the example touch position analysis circuitry 606, and the example haptic feedback instruction circuitry 608.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output device(s) 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1632, which may be implemented by the machine readable instructions of FIG. 13, may be stored in the mass storage device 1628, in the volatile memory 1614, in the non-volatile memory 1616, and/or on a removable non-transitory computer readable storage medium such as a CD or DVD.

Figure 17:
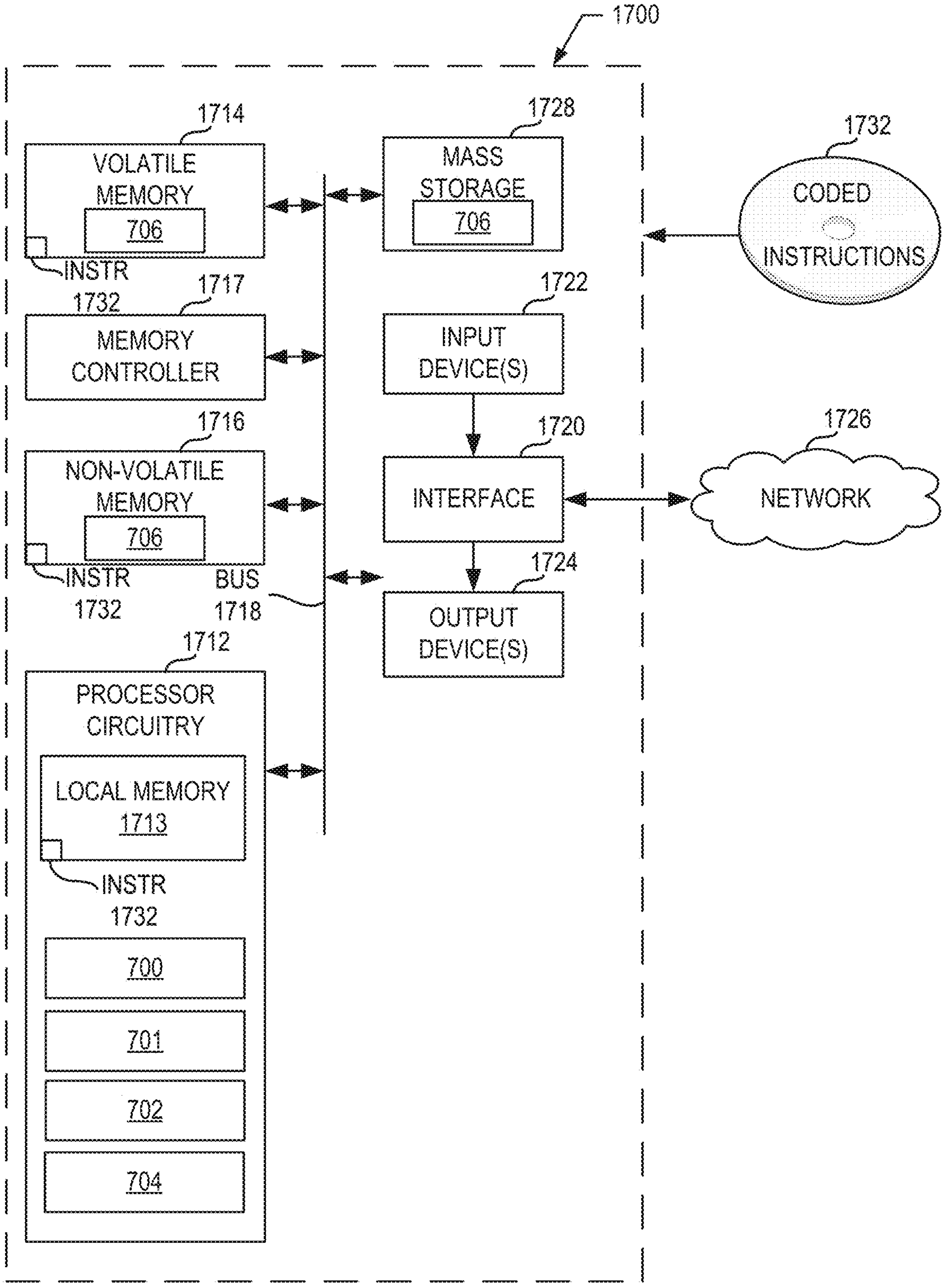
FIG. 17 is a block diagram of an example processing platform including processor circuitry structured to execute the example machine readable instructions and/or the example operations of FIG. 14 to implement the example haptic feedback control circuitry of FIG. 7.

FIG. 17 is a block diagram of an example processor platform 1400 structured to execute and/or instantiate the machine readable instructions and/or the operations of FIG. 14 to implement the haptic feedback control circuitry 132 of FIG. 7. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1700 of the illustrated example includes processor circuitry 1712. The processor circuitry 1712 of the illustrated example is hardware. For example, the processor circuitry 1712 can be implemented by one or more integrated circuits, logic circuits, FPGAs, microprocessors, CPUs, GPUs, DSPs, and/or microcontrollers from any desired family or manufacturer. The processor circuitry 1712 may be implemented by one or more semiconductor based (e.g., silicon based) devices. In this example, the processor circuitry 1712 implements the example instruction receiving circuitry 700, the example actuator selection circuitry 701, the example actuator instruction circuitry 702, and the example actuator interface circuitry 704.

The processor circuitry 1712 of the illustrated example includes a local memory 1713 (e.g., a cache, registers, etc.). The processor circuitry 1712 of the illustrated example is in communication with a main memory including a volatile memory 1714 and a non-volatile memory 1716 by a bus 1718. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1716 may be implemented by flash memory and/or any other desired type of memory device. Access to the main memory 1714, 1716 of the illustrated example is controlled by a memory controller 1717.

The processor platform 1700 of the illustrated example also includes interface circuitry 1720. The interface circuitry 1720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1722 are connected to the interface circuitry 1720. The input device(s) 1722 permit(s) a user to enter data and/or commands into the processor circuitry 1712. The input device(s) 1722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuitry 1720 of the illustrated example. The output device(s) 1724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1720 of the illustrated example, thus, typically includes a graphics driver card, a graphics driver chip, and/or graphics processor circuitry such as a GPU.

The interface circuitry 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1700 of the illustrated example also includes one or more mass storage devices 1728 to store software and/or data. Examples of such mass storage devices 1728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1732, which may be implemented by the machine readable instructions of FIG. 14, may be stored in the mass storage device 1728, in the volatile memory 1414, in the non-volatile memory 1716, and/or on a removable non-transitory computer readable storage medium such as a CD or DVD.

Figure 18:
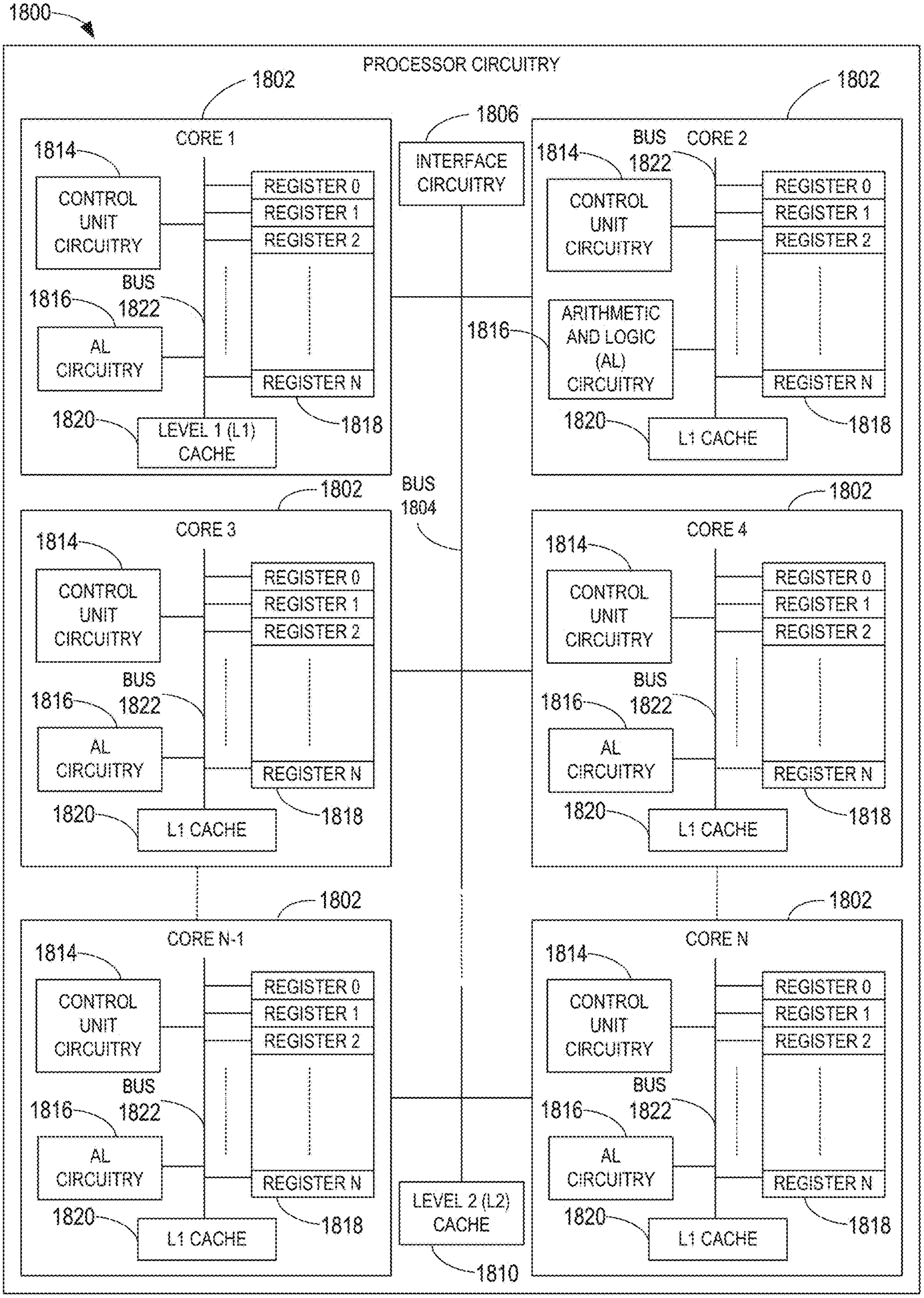
FIG. 18 is a block diagram of an example implementation of the processor circuitry of FIGS. 15, 16, and/or 17.

FIG. 18 is a block diagram of an example implementation of the processor circuitry 1512 of FIG. 15, the processor circuitry 1612 of FIG. 15, and/or the processor circuitry 1712 of FIG. 17. In this example, the 1512 of FIG. 15, the processor circuitry 1612 of FIG. 15, and/or the processor circuitry 1712 of FIG. 17 is implemented by a general purpose microprocessor 1800. The general purpose microprocessor circuitry 1800 executes some or all of the machine readable instructions of the flowcharts of FIGS. 12, 13, and/or 14 to effectively instantiate the circuitry of FIGS. 5, 6, and/or 7 as logic circuits to perform the operations corresponding to those machine readable instructions. In some such examples, the circuitry of FIGS. 5, 6, and/or 7 is instantiated by the hardware circuits of the microprocessor 1800 in combination with the instructions. For example, the microprocessor 1800 may implement multi-core hardware circuitry such as a CPU, a DSP, a GPU, an XPU, etc. Although it may include any number of example cores 1802 (e.g., 1 core), the microprocessor 1800 of this example is a multi-core semiconductor device including N cores. The cores 1802 of the microprocessor 1800 may operate independently or may cooperate to execute machine readable instructions. For example, machine code corresponding to a firmware program, an embedded software program, or a software program may be executed by one of the cores 1802 or may be executed by multiple ones of the cores 1802 at the same or different times. In some examples, the machine code corresponding to the firmware program, the embedded software program, or the software program is split into threads and executed in parallel by two or more of the cores 1802. The software program may correspond to a portion or all of the machine readable instructions and/or operations represented by the flowcharts of FIGS. 12, 13, and/or 14.

The cores 1802 may communicate by a first example bus 1804. In some examples, the first bus 1804 may implement a communication bus to effectuate communication associated with one(s) of the cores 1802. For example, the first bus 1804 may implement at least one of an Inter-Integrated Circuit (I2C) bus, a Serial Peripheral Interface (SPI) bus, a PCI bus, or a PCIe bus. Additionally or alternatively, the first bus 1804 may implement any other type of computing or electrical bus. The cores 1802 may obtain data, instructions, and/or signals from one or more external devices by example interface circuitry 1806. The cores 1802 may output data, instructions, and/or signals to the one or more external devices by the interface circuitry 1806. Although the cores 1802 of this example include example local memory 1820 (e.g., Level 1 (L1) cache that may be split into an L1 data cache and an L1 instruction cache), the microprocessor 1800 also includes example shared memory 1810 that may be shared by the cores (e.g., Level 2 (L2_cache)) for high-speed access to data and/or instructions. Data and/or instructions may be transferred (e.g., shared) by writing to and/or reading from the shared memory 1810. The local memory 1820 of each of the cores 1802 and the shared memory 1810 may be part of a hierarchy of storage devices including multiple levels of cache memory and the main memory (e.g., the main memory 1514, 1516 of FIG. 15, the main memory 1614, 1616 of FIG. 16, the main memory 1714, 1716 of FIG. 17). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1802 may be referred to as a CPU, DSP, GPU, etc., or any other type of hardware circuitry. Each core 1802 includes control unit circuitry 1814, arithmetic and logic (AL) circuitry (sometimes referred to as an ALU) 1816, a plurality of registers 1818, the L1 cache 1820, and a second example bus 1822. Other structures may be present. For example, each core 1802 may include vector unit circuitry, single instruction multiple data (SIMD) unit circuitry, load/store unit (LSU) circuitry, branch/jump unit circuitry, floating-point unit (FPU) circuitry, etc. The control unit circuitry 1814 includes semiconductor-based circuits structured to control (e.g., coordinate) data movement within the corresponding core 1802. The AL circuitry 1816 includes semiconductor-based circuits structured to perform one or more mathematic and/or logic operations on the data within the corresponding core 1802. The AL circuitry 1816 of some examples performs integer based operations. In other examples, the AL circuitry 1816 also performs floating point operations. In yet other examples, the AL circuitry 1816 may include first AL circuitry that performs integer based operations and second AL circuitry that performs floating point operations. In some examples, the AL circuitry 1816 may be referred to as an Arithmetic Logic Unit (ALU). The registers 1818 are semiconductor-based structures to store data and/or instructions such as results of one or more of the operations performed by the AL circuitry 1816 of the corresponding core 1802. For example, the registers 1818 may include vector register(s), SIMD register(s), general purpose register(s), flag register(s), segment register(s), machine specific register(s), instruction pointer register(s), control register(s), debug register(s), memory management register(s), machine check register(s), etc. The registers 1818 may be arranged in a bank as shown in FIG. 18. Alternatively, the registers 1818 may be organized in any other arrangement, format, or structure including distributed throughout the core 1802 to shorten access time. The second bus 1822 may implement at least one of an I2C bus, a SPI bus, a PCI bus, or a PCIe bus Each core 1802 and/or, more generally, the microprocessor 1800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 19:
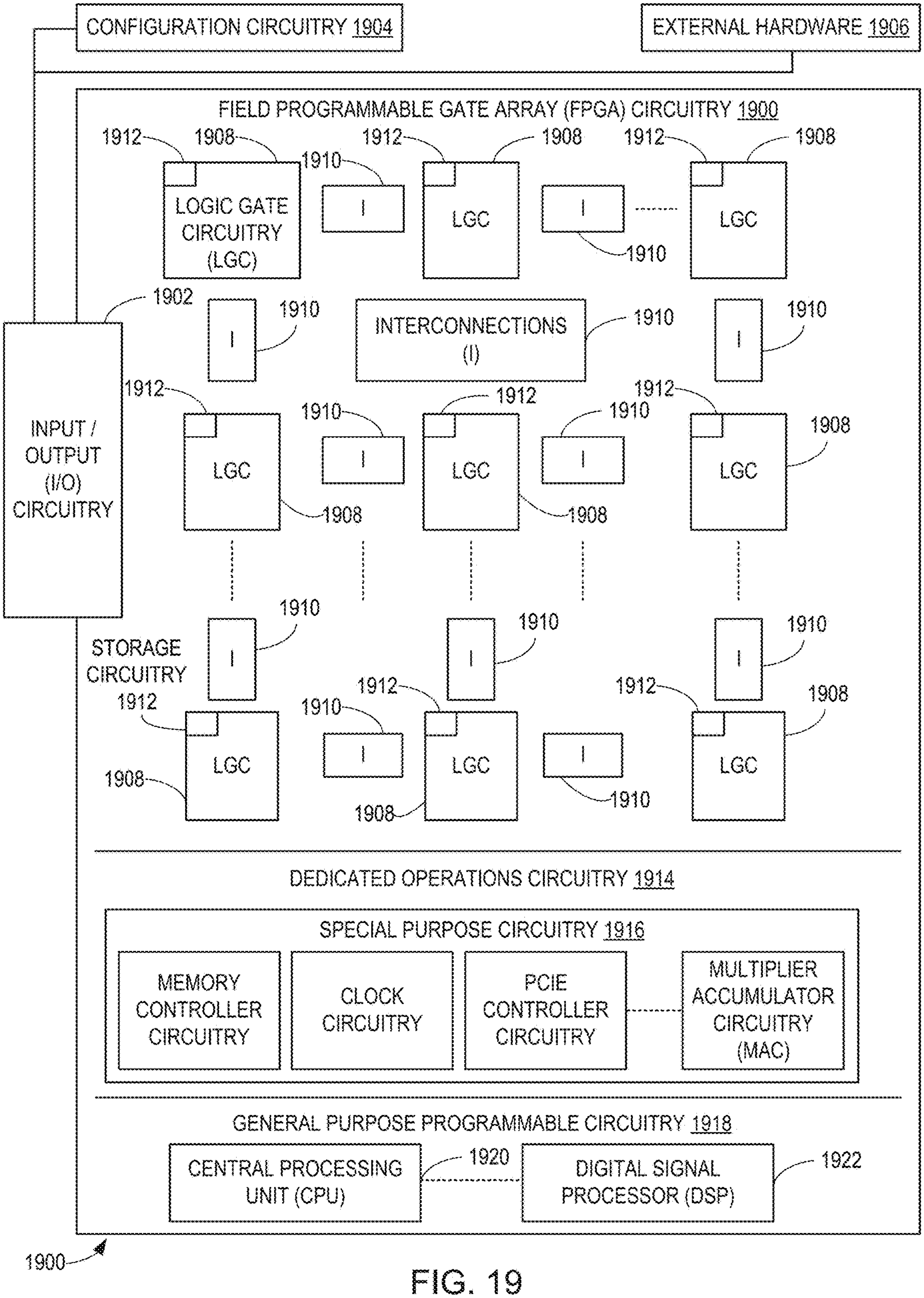
FIG. 19 is a block diagram of another example implementation of the processor circuitry of FIGS. 15, 16, and/or 17.

FIG. 19 is a block diagram of another example implementation of the processor circuitry processor circuitry 1512 of FIG. 15, the processor circuitry 1612 of FIG. 15, and/or the processor circuitry 1712 of FIG. 17. In this example, the processor circuitry 1912 is implemented by FPGA circuitry 1900. The FPGA circuitry 1900 can be used, for example, to perform operations that could otherwise be performed by the example microprocessor 1800 of FIG. 18 executing corresponding machine readable instructions. However, once configured, the FPGA circuitry 1900 instantiates the machine readable instructions in hardware and, thus, can often execute the operations faster than they could be performed by a general purpose microprocessor executing the corresponding software.

More specifically, in contrast to the microprocessor 1800 of FIG. 18 described above (which is a general purpose device that may be programmed to execute some or all of the machine readable instructions represented by the flowcharts of FIGS. 12, 13, and/or 14 but whose interconnections and logic circuitry are fixed once fabricated), the FPGA circuitry 1900 of the example of FIG. 19 includes interconnections and logic circuitry that may be configured and/or interconnected in different ways after fabrication to instantiate, for example, some or all of the machine readable instructions represented by the flowcharts of FIGS. 12, 13, and/or 14. In particular, the FPGA 1900 may be thought of as an array of logic gates, interconnections, and switches. The switches can be programmed to change how the logic gates are interconnected by the interconnections, effectively forming one or more dedicated logic circuits (unless and until the FPGA circuitry 1900 is reprogrammed). The configured logic circuits enable the logic gates to cooperate in different ways to perform different operations on data received by input circuitry. Those operations may correspond to some or all of the software represented by the flowcharts of FIGS. 12, 13, and/or 14. As such, the FPGA circuitry 1900 may be structured to effectively instantiate some or all of the machine readable instructions of the flowcharts of FIGS. 12, 13, and/or 14 as dedicated logic circuits to perform the operations corresponding to those software instructions in a dedicated manner analogous to an ASIC. Therefore, the FPGA circuitry 1900 may perform the operations corresponding to the some or all of the machine readable instructions of FIGS. 12, 13, and/or 14 faster than the general purpose microprocessor can execute the same.

In the example of FIG. 19, the FPGA circuitry 1900 is structured to be programmed (and/or reprogrammed one or more times) by an end user by a hardware description language (HDL) such as Verilog. The FPGA circuitry 1900 of FIG. 19, includes example input/output (I/O) circuitry 1902 to obtain and/or output data to/from example configuration circuitry 1904 and/or external hardware (e.g., external hardware circuitry) 1906. For example, the configuration circuitry 1904 may implement interface circuitry that may obtain machine readable instructions to configure the FPGA circuitry 1900, or portion(s) thereof. In some such examples, the configuration circuitry 1904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1906 may implement the microprocessor 1800 of FIG. 18. The FPGA circuitry 1900 also includes an array of example logic gate circuitry 1908, a plurality of example configurable interconnections 1910, and example storage circuitry 1912. The logic gate circuitry 1908 and interconnections 1910 are configurable to instantiate one or more operations that may correspond to at least some of the machine readable instructions of FIGS. 12, 13, and/or 14 and/or other desired operations. The logic gate circuitry 1908 shown in FIG. 19 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1908 to enable configuration of the electrical structures and/or the logic gates to form circuits to perform desired operations. The logic gate circuitry 1908 may include other electrical structures such as look-up tables (LUTs), registers (e.g., flip-flops or latches), multiplexers, etc.

The interconnections 1910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1908 to program desired logic circuits.

The storage circuitry 1912 of the illustrated example is structured to store result(s) of the one or more of the operations performed by corresponding logic gates. The storage circuitry 1912 may be implemented by registers or the like. In the illustrated example, the storage circuitry 1912 is distributed amongst the logic gate circuitry 1908 to facilitate access and increase execution speed.

The example FPGA circuitry 1900 of FIG. 19 also includes example Dedicated Operations Circuitry 1914. In this example, the Dedicated Operations Circuitry 1914 includes special purpose circuitry 1916 that may be invoked to implement commonly used functions to avoid the need to program those functions in the field. Examples of such special purpose circuitry 1916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1900 may also include example general purpose programmable circuitry 1918 such as an example CPU 1920 and/or an example DSP 1922. Other general purpose programmable circuitry 1918 may additionally or alternatively be present such as a GPU, an XPU, etc., that can be programmed to perform other operations.

Although FIGS. 18 and 19 illustrate two example implementations of the processor circuitry processor circuitry 1512 of FIG. 15, the processor circuitry 1612 of FIG. 15, and/or the processor circuitry 1712 of FIG. 17, many other approaches are contemplated. For example, as mentioned above, modern FPGA circuitry may include an on-board CPU, such as one or more of the example CPU 1920 of FIG. 19. Therefore, the processor circuitry 1512 of FIG. 15, the processor circuitry 1612 of FIG. 15, and/or the processor circuitry 1712 of FIG. 17 may additionally be implemented by combining the example microprocessor 1800 of FIG. 18 and the example FPGA circuitry 1900 of FIG. 19. In some such hybrid examples, a first portion of the machine readable instructions represented by the flowcharts of FIGS. 12, 13, and/or 14 may be executed by one or more of the cores 1802 of FIG. 18, a second portion of the machine readable instructions represented by the flowcharts of FIGS. 12, 13, and/or 14 may be executed by the FPGA circuitry 1900 of FIG. 19, and/or a third portion of the machine readable instructions represented by the flowcharts of FIGS. 12, 13, and/or 14 may be executed by an ASIC. It should be understood that some or all of the circuitry of FIGS. 5, 6, and/or 7 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1512 of FIG. 15, the processor circuitry 1612 of FIG. 15, and/or the processor circuitry 1712 of FIG. 17 may be in one or more packages. For example, the processor circuitry 1800 of FIG. 18 and/or the FPGA circuitry 1900 of FIG. 19 may be in one or more packages. In some examples, an XPU may be implemented by the processor circuitry processor circuitry 1512 of FIG. 15, the processor circuitry 1612 of FIG. 15, and/or the processor circuitry 1712 of FIG. 17, which may be in one or more packages. For example, the XPU may include a CPU in one package, a DSP in another package, a GPU in yet another package, and an FPGA in still yet another package.

Figure 20:
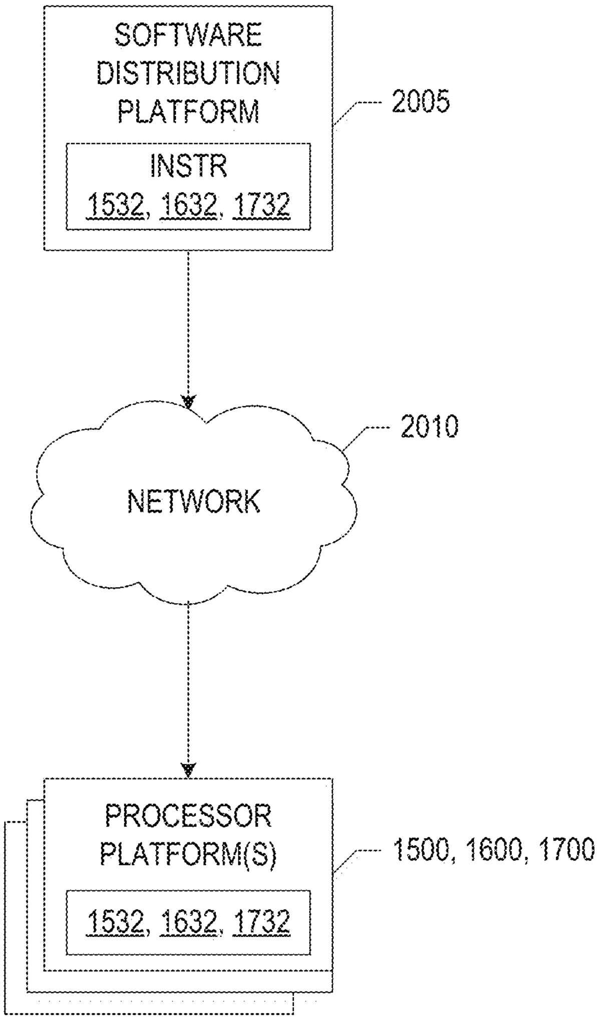
FIG. 20 is a block diagram of an example software distribution platform (e.g., one or more servers) to distribute software (e.g., software corresponding to the example machine readable instructions of FIGS. 12, 13, and/or 14) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2005 to distribute software such as the example machine readable instructions 1532 of FIG. 15, the example machine readable instructions 1632 of FIG. 16, and/or the example machine readable instructions 1732 of FIG. 17 to hardware devices owned and/or operated by third parties is illustrated in FIG. 20. The example software distribution platform 2005 may be implemented by any computer server, data facility, cloud service, etc., capable of storing and transmitting software to other computing devices. The third parties may be customers of the entity owning and/or operating the software distribution platform 2005. For example, the entity that owns and/or operates the software distribution platform 2005 may be a developer, a seller, and/or a licensor of software such as the example machine readable instructions 1532 of FIG. 15, the example machine readable instructions 1632 of FIG. 16, and/or the example machine readable instructions 1732 of FIG. 17. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1532, which may correspond to the example machine readable instructions 1200 of FIG. 12; machine readable instructions 1632, which may correspond to the example machine readable instructions 1300 of FIG. 13; and/or machine readable instructions 1732, which may correspond to the example machine readable instructions 1400 of FIG. 14, as described above. The one or more servers of the example software distribution platform 2005 are in communication with a network 2010, which may correspond to any one or more of the Internet and/or any of the example networks 1526, 1626, 1726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1532, 1632, 1732 from the software distribution platform 2005. For example, the software, which may correspond to the example machine readable instructions 1200 of FIG. 12, may be downloaded to the example processor platforms 1500, which is to execute the machine readable instructions 1532 to implement the touch response area detection circuitry 133. The software, which may correspond to the example machine readable instructions 1300 of FIG. 13, may be downloaded to the example processor platforms 1600, which is to execute the machine readable instructions 1632 to implement the haptic feedback analysis circuitry 134. The software, which may correspond to the example machine readable instructions 1400 of FIG. 12, may be downloaded to the example processor platforms 1700, which is to execute the machine readable instructions 1732 to implement the haptic feedback control circuitry 132. In some example, one or more servers of the software distribution platform 2005 periodically offer, transmit, and/or force updates to the software (e.g., the example machine readable instructions 1532 of FIG. 15, the example machine readable instructions 1632 of FIG. 16, the example machine readable instructions 1732 of FIG. 17) to ensure improvements, patches, updates, etc., are distributed and applied to the software at the end user devices.

From the foregoing, it will be appreciated that example systems, methods, apparatus, and articles of manufacture have been disclosed that provide for selective haptic feedback in response to user touch input(s) on a display screen of an electronic user device. Examples disclosed herein dynamically identify a touch response area for which haptic feedback is to be generated at a given time relative to other portions of a display screen that are not associated with haptic feedback outputs. Examples disclosed herein compare the location(s) of touch event(s) relative to the touch response area to determine if the touch event(s) occurred within the touch response area. If the touch event(s) occurred within the touch response area, examples disclosed herein identify which haptic feedback actuator(s) of the display screen are to generate the haptic feedback. Examples disclosed herein respond to changes in the location of the touch response area due to, for example, user manipulation of a location of a virtual keyboard on the display screen. Examples disclosed herein further provide for efficient exchanges of data between touch control circuitry, haptic feedback analysis circuitry, and haptic feedback control circuitry based on available processing resources.

Example systems, apparatus, and methods for providing haptic feedback at electronic user devices are disclosed herein. Further examples and combinations thereof include the following:

Example 1 includes an apparatus comprising processor circuitry including one or more of: at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus; a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry (ASIC) including logic gate circuitry to perform one or more third operations; the processor circuitry to perform at least one of the first operations, the second operations, or the third operations to instantiate: touch response area detection circuitry to identify a touch response area of a display screen; haptic feedback analysis circuitry to: detect that a location of a touch on the display screen is within the touch response area; and output an instruction to cause a haptic feedback response; and haptic feedback control circuitry to, in response to the instruction, cause a haptic feedback actuator to generate the haptic feedback response based on the location of the touch and a property of the haptic feedback response.

Example 2 includes the apparatus of example 1, wherein the touch response area detection circuitry is to identify the touch response area based on an application associated with graphical content presented via the display screen.

Example 3 includes the apparatus of examples 1 or 2, wherein the touch response area detection circuitry is to identify the touch response area based on a display frame presented via the display screen.

Example 4 includes the apparatus of any of examples 1-3, further including touch control circuitry, the haptic feedback analysis circuitry to detect a location of the touch on the display screen relative to the touch response area based on receipt of touch position data from the touch control circuitry.

Example 5 includes the apparatus of any of examples 1-4, wherein the haptic feedback actuator is a first haptic feedback actuator and the haptic feedback control circuitry is to select the first haptic feedback actuator and one or more other haptic feedback actuators to generate the haptic feedback response based on the location of the touch.

Example 6 includes the apparatus of any of examples 1-5, wherein the haptic feedback control circuitry is to cause the haptic feedback actuator to vibrate at a frequency based on the property of the haptic feedback response.

Example 7 includes the apparatus of any of examples 1-6, wherein the touch is a first touch, the touch response area is associated with a first location at a first time, the first time corresponding to the first touch, and the touch response area detection circuitry is to identify a second location of the touch response area at a second time.

Example 8 includes the apparatus of any of examples 1-7, wherein the second location of the touch response area is different than the first location.

Example 9 includes the apparatus of any of examples 1-8, wherein touch event includes a stylus touch event.

Example 10 includes the apparatus of any of examples 1-9, wherein the haptic feedback analysis circuitry is to output touch position data including the location of the touch.

Example 11 includes an electronic device comprising a display; memory; instructions; processor circuitry to execute the instructions to define a touch response area within a display region of the display, the touch response area corresponding to graphical content presented via the display; determine a location of a touch is within the touch response area; and cause a haptic feedback actuator to output a haptic feedback response to the determination that the touch is within the touch response area.

Example 12 includes the electronic device of example 11, wherein the processor circuitry is to define the touch response area based on a location of the graphical content relative to the display.

Example 13 includes the electronic device of examples 11 or 12, wherein the processor circuitry is to output instructions identifying a property of the haptic feedback response to be generated by the haptic feedback actuator.

Example 14 includes the electronic device of any of examples 11-13, wherein the haptic feedback response includes vibrations and the property includes a strength of the vibrations.

Example 15 includes the electronic device of any of examples 11-14, wherein the touch includes a stylus touch event.

Example 16 includes the electronic device of any of examples 11-15, wherein the processor circuitry is to define the touch response area based on an application associated with the graphical content.

Example 17 includes the electronic device of any of examples 11-16, wherein the touch response area is a first touch response area, and the processor circuitry is to define a second touch response area of the display.

Example 18 includes the electronic device of any of examples 11-17, wherein a location of the first touch response area on the display is different than a location of the second touch response area on the display.

Example 19 includes the electronic device of any of examples 11-18, wherein the location of the first touch response area and the location of the second touch response area do not overlap.

Example 20 includes at least one non-transitory computer readable medium comprising instructions which, when executed, cause one or more processors of a computing device to at least identify a location of a touch response area of a display, the touch response area corresponding to at least a position of a graphical user interface (GUI) presented via the display; perform a comparison of a location of a touch on the display and the location of the touch response area; and cause a haptic feedback actuator to output a haptic feedback response to the touch based on the comparison.

Example 21 includes the at least one non-transitory computer readable medium of example 20, wherein the instructions cause the one or more processors to identify the location of the touch response area relative to the GUI.

Example 22 includes the at least one non-transitory computer readable medium of examples 20 or 21, wherein the instructions cause the one or more processors to identify the location of the touch response area based on a display frame.

Example 23 includes the at least one non-transitory computer readable medium of any of examples 20-22, wherein the instructions cause the one or more processors to identify the location of the touch response area based on an application associated with the GUI.

Example 24 includes the at least one non-transitory computer readable medium of any of examples 20-23, wherein the touch is a first touch, the touch response area is a first touch response area, and the instructions, cause the one or more processors to identify a second touch response area of the display.

Example 25 includes an apparatus comprising means for analyzing a touch response area, the touch response area analyzing means to identify the touch response area of a display screen; means for analyzing touch location, the touch position analyzing means to detect a location of a touch on the display screen relative to the touch response area; means for instructing haptic feedback, the haptic feedback instructing means to: detect that the location of the touch is within the touch response area; and output a property of a haptic feedback response; and means for instructing an actuator, the actuator instructing means to, in response to the instruction, cause a haptic feedback actuator to generate the haptic feedback response based on the location of the touch and the property of the haptic feedback response.

Example 26 includes the apparatus of example 25, wherein the touch response area analyzing means is to identify the touch response area based on an application associated with graphical content presented via the display screen.

Example 27 includes the apparatus of examples 25 or 26, wherein the touch response area analyzing means is to identify the touch response area based on a display frame presented via the display screen.

Example 28 includes the apparatus of any of examples 25-27, wherein the haptic feedback actuator is a first haptic feedback actuator and further including means for selecting an actuator, the actuator selecting means to select the first haptic feedback actuator and one or more other haptic feedback actuators to generate the haptic feedback response based on the location of the touch.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

at least one processor circuit including one or more of:

at least one of a central processing unit, a graphic processing unit, or a digital signal processor, the at least one of the central processing unit, the graphic processing unit, or the digital signal processor having control circuitry to control data movement within one or more of the at least one processor circuit, arithmetic and logic circuitry to perform one or more first operations corresponding to instructions, and one or more registers to store a result of the one or more first operations, the instructions in the apparatus;

a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry (ASIC) including logic gate circuitry to perform one or more third operations;

one or more of the at least one processor circuit to perform at least one of the first operations, the second operations, or the third operations to instantiate:

touch response area detection circuitry to identify first coordinates of a touch response area of a display screen;

haptic feedback analysis circuitry to:

detect that a location of a touch on the display screen is within the touch response area based on the first coordinates of the touch response area and second coordinates corresponding to the location of the touch; and output an instruction to cause a haptic feedback response; and haptic feedback control circuitry to, in response to the instruction, cause a haptic feedback actuator to generate the haptic feedback response based on the location of the touch and a property of the haptic feedback response.

2. The apparatus of claim 1, wherein the touch response area detection circuitry is to identify the first coordinates of the touch response area based on an application associated with graphical content presented via the display screen.

3. The apparatus of claim 1, further including touch control circuitry, the haptic feedback analysis circuitry to detect the location of the touch on the display screen relative to the touch response area responsive to receipt of touch position data from the touch control circuitry.

4. The apparatus of claim 1, wherein the haptic feedback actuator is a first haptic feedback actuator and the haptic feedback control circuitry is to select the first haptic feedback actuator and one or more other haptic feedback actuators to generate the haptic feedback response based on the location of the touch.

5. The apparatus of claim 1, wherein the haptic feedback control circuitry is to cause the haptic feedback actuator to vibrate at a frequency based on the property of the haptic feedback response.

6. The apparatus of claim 1, wherein the touch is a first touch, the first coordinates defining a first location of the touch response area at a first time, the first time corresponding to the first touch, and the touch response area detection circuitry is to identify third coordinates defining a second location of the touch response area at a second time.

7. The apparatus of claim 6, wherein the second location of the touch response area is different than the first location.

8. An electronic device comprising:

a display;

memory;

machine-readable instructions;

at least one processor circuit to execute the machine-readable instructions to:

determine a location of a touch is within a touch response area within a display region of the display based on first coordinates defining the touch response area and second coordinates corresponding to the location of the touch; and cause a haptic feedback actuator to output a haptic feedback response to the determination that the touch is within the touch response area.

9. The electronic device of claim 8, wherein one or more of the at least one processor circuit is to define the touch response area based on a location of graphical content relative to the display.

10. The electronic device of claim 9, wherein the touch response area is a first touch response area, and one or more of the at least one processor circuit is to define a second touch response area of the display.

11. The electronic device of claim 10, wherein a location of the first touch response area on the display is different than a location of the second touch response area on the display.

12. The electronic device of claim 11, wherein the location of the first touch response area and the location of the second touch response area do not overlap.

13. The electronic device of claim 8, wherein one or more of the at least one processor circuit is to output instructions identifying a property of the haptic feedback response to be generated by the haptic feedback actuator.

14. The electronic device of claim 13, wherein the haptic feedback response includes vibrations and the property includes a strength of the vibrations.

15. The electronic device of claim 8, wherein the touch includes a stylus touch event.

16. The electronic device of claim 8, wherein one or more of the at least one processor circuit is to define the touch response area based on graphical content associated with an application.

17. At least one non-transitory computer readable medium comprising machine-readable instructions to cause at least one processor circuit to at least:

perform a comparison of a location of a touch on a display and a location of a touch response area of the display based on first coordinates corresponding to the location of the touch and second coordinates defining the location of the touch response area, the touch response area corresponding to at least a position of a graphical user interface (GUI) presented via the display; and cause a haptic feedback actuator to output a haptic feedback response to the touch based on the comparison.

18. The at least one non-transitory computer readable medium of claim 17, wherein the machine-readable instructions are to cause one or more of the at least one processor circuit to identify the location of the touch response area relative to the GUI.

19. The at least one non-transitory computer readable medium of claim 17, wherein the machine-readable instructions are to cause one or more of the at least one processor circuit to identify the location of the touch response area based on an application associated with the GUI.

20. The at least one non-transitory computer readable medium of claim 17, wherein the touch is a first touch, the touch response area is a first touch response area, and the machine-readable instructions are to cause one or more of the at least one processor circuit to identify a location of a second touch response area of the display.

* * * * *